US011452163B2

(12) United States Patent
Park et al.

(10) Patent No.: US 11,452,163 B2
(45) **Date of Patent: *Sep. 20, 2022**

(54) METHOD FOR INTERACTION BETWEEN LAYERS IN WIRELESS COMMUNICATION SYSTEM AND APPARATUS THEREFOR

(71) Applicant: LG Electronics Inc., Seoul (KR)

(72) Inventors: Sangmin Park, Seoul (KR); Hyunsook Kim, Seoul (KR); Jinsook Ryu, Seoul (KR); Dongsoo Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

This patent is subject to a terminal disclaimer.

(21) Appl. No.: 16/818,331

(22) Filed: Mar. 13, 2020

(65) Prior Publication Data

US 2020/0221529 A1 Jul. 9, 2020

Related U.S. Application Data

(63) Continuation of application No. 16/496,325, filed as application No. PCT/KR2018/003234 on Mar. 20, 2018, now Pat. No. 10,631,357.

(Continued)

(51) Int. Cl.

*H04W 76/25* (2018.01)
*H04W 76/18* (2018.01)

(Continued)

(52) U.S. Cl.

CPC ............. *H04W 76/25* (2018.02); *H04W 8/08* (2013.01); *H04W 48/17* (2013.01); *H04W 76/18* (2018.02); *H04W 76/30* (2018.02); *H04W 80/10* (2013.01)

(58) Field of Classification Search

None

See application file for complete search history.

(56) References Cited

U.S. PATENT DOCUMENTS 10,448,419 B2 10/2019 Stojanovski et al.
10,631,357 B2 * 4/2020 Park ...................... H04W 80/02

(Continued)

FOREIGN PATENT DOCUMENTS

CN 101669377 3/2010
CN 102868634 1/2013

(Continued)

OTHER PUBLICATIONS

Dualcommincorporated, TS23.502: Procedures for use of NAS Transport, S2-170827, 3GPPTSGSAWG2 Meeting#119, Dubrovnik, Croatia, Feb. 8, 2017, 5 pages (Year: 2017).*

(Continued)

*Primary Examiner* — Kouroush Mohebbi

(74) *Attorney, Agent, or Firm* — Fish & Richardson P.C.

(57) ABSTRACT

A method for forwarding a non-access stratum (NAS) message of a user equipment (UE) in a wireless communication system is disclosed. The method includes sending an uplink (UL) NAS message including a session management (SM) message to an access and mobility management function (AMF), and receiving, from the AMF, an indication message indicating that the SM message is unroutable, wherein indication information indicating that the SM message is unroutable is delivered to a SM sublayer of the UE.

20 Claims, 21 Drawing Sheets

Related U.S. Application Data

(60) Provisional application No. 62/473,490, filed on Mar. 20, 2017.

(51) Int. Cl.

| | |
|---|---|
| ***H04W 76/30*** | (2018.01) |
| ***H04W 8/08*** | (2009.01) |
| ***H04W 48/00*** | (2009.01) |
| ***H04W 80/10*** | (2009.01) |

(56) References Cited

U.S. PATENT DOCUMENTS

| | | | |
|---|---|---|---|
| 2013/0258967 A1 | 10/2013 | Watfa et al. | |
| 2014/0341041 A1* | 11/2014 | Velev | H04W 76/10 370/236 |
| 2015/0256961 A1 | 9/2015 | Kim et al. | |
| 2016/0183156 A1 | 6/2016 | Chin et al. | |
| 2017/0171752 A1 | 5/2017 | Lee et al. | |
| 2020/0053685 A1 | 2/2020 | Chandramouli et al. | |
| 2020/0059989 A1 | 2/2020 | Velev et al. | |

FOREIGN PATENT DOCUMENTS

| | | |
|---|---|---|
| CN | 103281688 | 9/2013 |
| CN | 105813079 | 7/2016 |
| EP | 2605606 | 1/2012 |
| JP | 2015505187 | 2/2015 |
| JP | 2015511409 | 4/2015 |

OTHER PUBLICATIONS

Ericsson, Verizon, Nokia, Nokia Shanghai Bell, LG Electronics, Samsung, "5G SM transport—AMF unable to forward SM message towards SMF," C1-174298, 3GPP TSG-CT WG1 Meeting #106, Kochi (India), Oct. 23-27, 2017, 4 pages.

Extended European Search Report in European Appln. No. 18770400.2, dated Jun. 22, 2020, 13 pages.

Qualcomm Inc., "Way forward on Key Issue 4 on Session Management for WT1 and WT2," S2-165766, SA WG2 Meeting #117, Oct. 17-21, 2016, Kaohsiung City, Taiwan, 22 pages.

Qualcomm Incorporated, "23.502—Procedures for Session management for LBO traffic in roaming scenarios," S2-170749, SA WG2 Meeting #S2-119, Feb. 13-17, 2017, Dubrovnik, Croatia, 8 pages.

Qualcomm Incorporated, "TS 23.502: Procedures for use of NAS Transport," S2-170827, 3GPP TSG SA WG2 Meeting #119, Dubrovnik, Croatia, Feb. 8, 2017, 5 pages.

3GPP TS 23.501 V0.3.1, 3GPP; TSG SA; System Architecture for the 5G System Stage 2 (Release 15), Mar. 6, 2017, 97 pages.

3GPP TS 23.502 V0.2.0, '3GPP; TSG SA; Procedures forthe 5G System; Stage 2 (Release 15)', Feb. 24, 2017, 71 pages.

3rd Generation Partnership Project; Technical Specification Group Services and System Aspects, "Study on Architecture for Next Generation System (Release 14)," 3GPP TR 23.799 V14.0.0, Dec. 2016, 522 pages.

PCT International Search Report in International Appln. No. PCT/KR2018/003235, dated Jul. 17, 2018, 7 pages (with English translation).

United States Office Action in U.S. Appl. No. 16/496,193, dated Oct. 23, 2020, 11 pages.

3rd Generation Partnership Project; Technical Specification Group Core Network and Terminals, "Non-Access-Stratum (NAS) protocol for Evolved Packet System (EPS); Stage 3 (Release 14)," 3GPP TS 24.301, dated Mar. 2017, 476 pages.

Japanese Office Action in Japanese Appln. No. 2019-552096, dated Nov. 17, 2020, 4 pages (with English translation).

United States Notice of Allowance in U.S. Appl. No. 16/496,193, dated Feb. 11, 2021, 8 pages.

Office Action in Chinese Appln. No. 201880019862.5, dated Sep. 1, 2021, 10 pages (with English translation).

Office Action in Chinese Appln. No. 201880019952.4, dated Sep. 15, 2021, 14 pages (with English translation).

Nokia et al., "Transfer from TR conclusions (§8.4) to clause 5.3 on SM / Part 4: 3rd party control of the activation of a PDU session," S2-170151 (revision of S2-170151), Presented at SA WG2 Meeting #118BIS, Jan. 16-20, 2017, Spokane, Washington, USA, 2 pages.

* cited by examiner

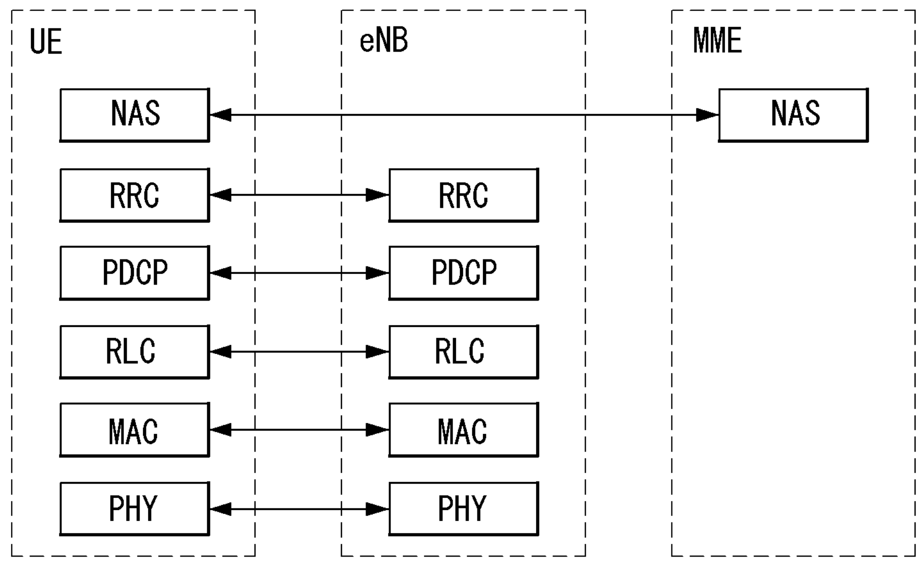
FIG. 4A Control plane protocol stack
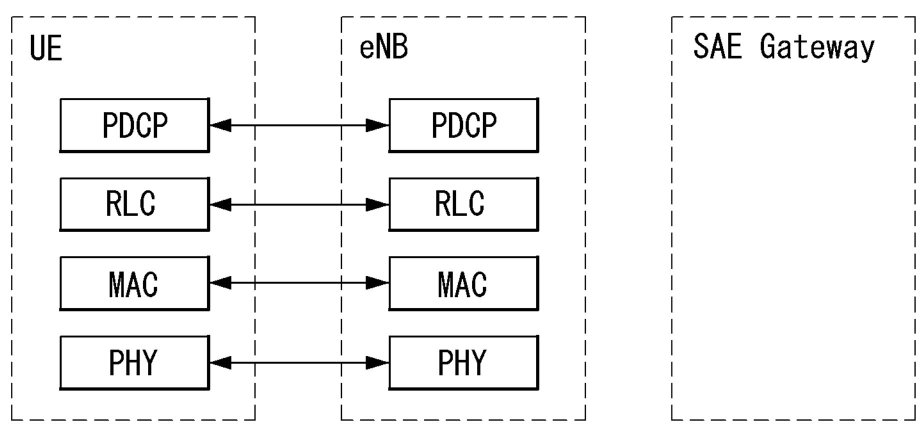
FIG. 4B User plane protocol stack

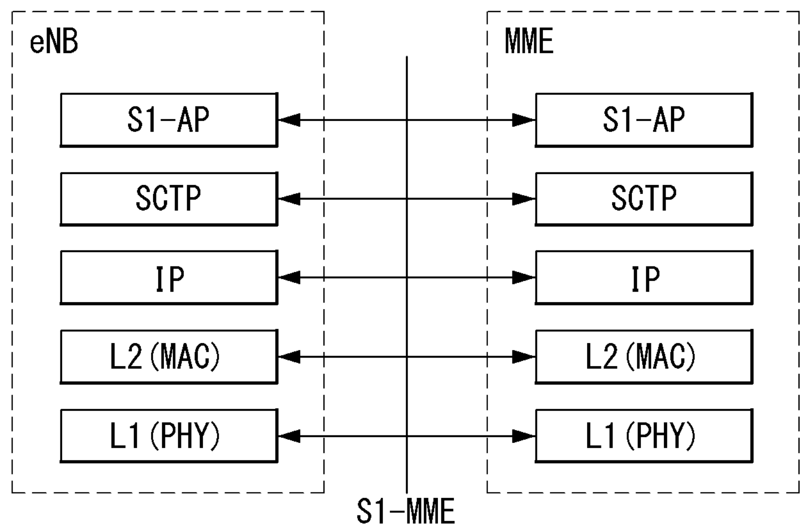
FIG. 5A Control plane protocol stack
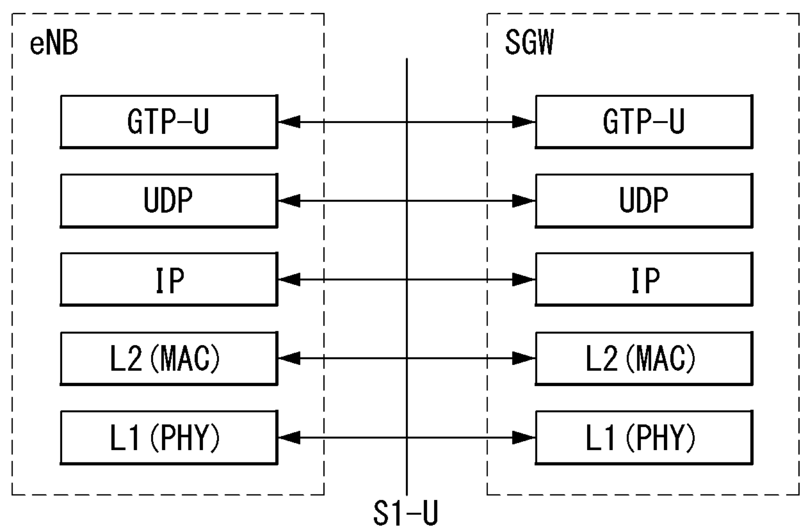
FIG. 5B User plane protocol stack FIG. 13
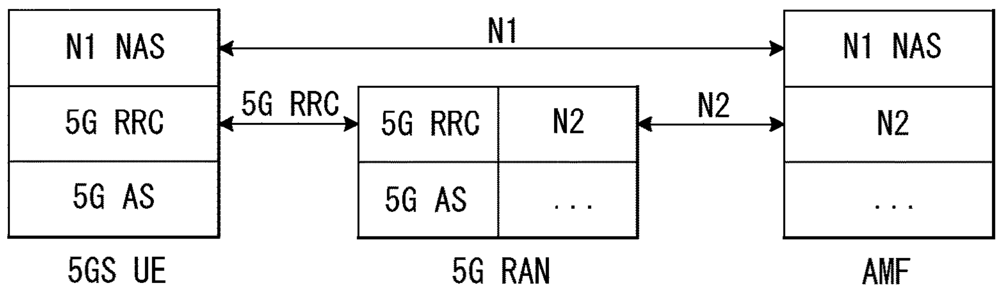
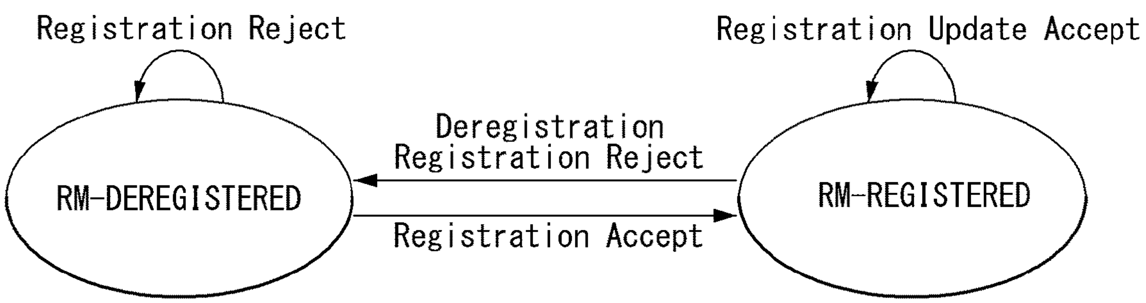
FIG. 14A
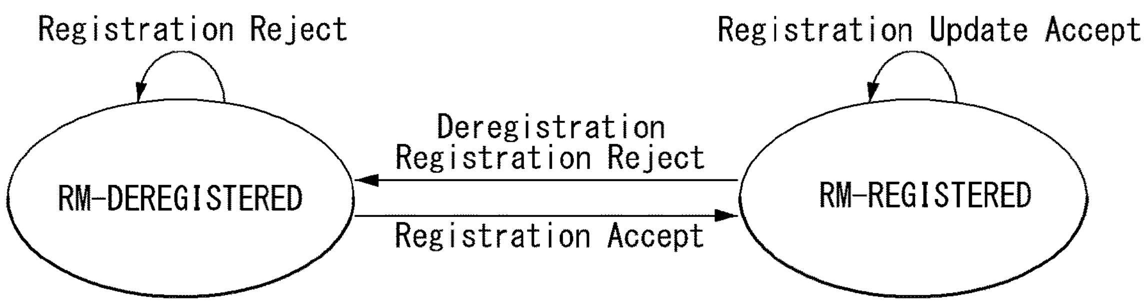
FIG. 14B

METHOD FOR INTERACTION BETWEEN LAYERS IN WIRELESS COMMUNICATION SYSTEM AND APPARATUS THEREFOR

CROSS-REFERENCE TO RELATED APPLICATIONS

This application is a continuation of U.S. application Ser. No. 16/496,325, filed on Sep. 20, 2019, which is a National Stage Application under 35 U.S.C. § 371 of International Application No. PCT/KR2018/003234, filed on Mar. 20, 2018, which claims the benefit of U.S. Provisional Application Ser. No. 62/473,490, filed on Mar. 20, 2017. The disclosure of the prior applications are incorporated by reference in their entirety.

TECHNICAL FIELD

The present invention relates to a wireless communication system, and more particularly to a method for handling a NAS message with a forwarding/routing failure through interaction/information exchange between layers and a device therefor.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

SUMMARY

An object of the present invention is to propose a method for properly processing/handling, at a UE side and a network side, a routing/forwarding failure situation of a SM message at an AMF that may occur as MM and SM functions are separated in a new wireless communication system.

Embodiments are proposed to describe a method and a device for solving the above-described technical problems. Technical problems to be solved by the present invention are not limited by the above-mentioned technical problems, and other technical problems which are not mentioned above can be clearly understood from the following description by those skilled in the art to which the present invention pertains.

In one aspect of the present invention, there is provided a method for forwarding a non-access stratum (NAS) message of a user equipment (UE) in a wireless communication system, the method comprising sending an uplink (UL) NAS message including a session management (SM) message to an access and mobility management function (AMF); and receiving, from the AMF, an indication message indicating that the SM message is unroutable, wherein indication information indicating that the SM message is unroutable is forwarded to a SM sublayer of the UE.

The SM message may be generated in the SM sublayer and may be forwarded to a MM sublayer that is a lower layer of the SM sublayer. The UL NAS message including the SM message may be sent to the AMF by the MM sublayer.

The SM sublayer may correspond to a sublayer that is defined for a protocol data unit (PDU) session control in the UE, and the MM sublayer may correspond to a sublayer that is defined for a mobility control of the UE in the UE.

The method may further comprise starting a pre-configured timer, if the SM sublayer forwards the SM message to the MM sublayer; and stopping the timer and stopping a procedure related to the SM message, if the indication information is received from the MM sublayer before the timer expires.

The method may further comprise retransmitting, by the SM sublayer, the SM message to the MM sublayer by a predetermined number of times, if the timer expires; and stopping a procedure related to the SM message, if the retransmission by the predetermined number of times fails.

The UL NAS message may further include a data network name (DNN) and/or single network slice selection assistance information (S-NSSAI) used for the selection of a session management function (SMF) to forward the SM message.

If the SM message is a message requesting an establishment of the PDU session, the UL NAS message may further include a PDU session identifier (ID) for the PDU session to which the establishment is requested.

The MM sublayer may forward, to the SM sublayer, information about whether the unroutable SM message is permanent or temporary, together with the indication information.

If the unroutable SM message is permanent, the SM sublayer may perform a release procedure for a PDU session and/or a data network (DN) related to the SM message.

The SM sublayer may include the PDU session and/or the DN in a procedure forbidden list and manage the PDU session and/or the DN.

If services related to the PDU session and/or the DN are required, the SM sublayer may request a deregistration to the MM sublayer.

In another aspect of the present invention, there is provided a user equipment (UE) performing an interworking method between networks in a wireless communication system, the UE comprising a communication module configured to transmit and receive a signal; and a processor configured to control the communication module, wherein the processor is configured to send an uplink (UL) NAS message including a session management (SM) message to an access and mobility management function (AMF), and receive, from the AMF, an indication message indicating that the SM message is unroutable, wherein indication information indicating that the SM message is unroutable is delivered to a SM sublayer of the UE.

The SM message may be generated in the SM sublayer and may be forwarded to a MM sublayer that is a lower layer of the SM sublayer. The UL NAS message including the SM message may be sent to the AMF by the MM sublayer.

The SM sublayer may correspond to a sublayer that is defined for a protocol data unit (PDU) session control in the UE, and the MM sublayer may correspond to a sublayer that is defined for a mobility control of the UE in the UE.

The SM sublayer may be configured to start a pre-configured timer, if the SM sublayer forwards the SM message to the MM sublayer, and stop the timer and stop a procedure for establishing the PDU session, if the indication information is received from the MM sublayer before the timer expires.

Since embodiments of the present invention enable interaction/information exchange between NAS layers/entities in preparation for various message forwarding/routing failure situations that may occur when a SM layer procedure and a MM layer procedure in 5GS and 5GC are independently separated and are simultaneously performed, they can improve message forwarding reliability/efficiency of a UE and a network and solve various problems resulting from the message forwarding/routing failure.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIGS. 4A-B illustrate a radio interface protocol structure between a UE and an E-UTRAN in a wireless communication system to which the present invention may be applied.

FIGS. 5A-B illustrate an S1 interface protocol structure in a wireless communication system to which the present invention may be applied.

FIG. 13 illustrates a protocol stack between a UE and a core network of 5G/NR system to which the present invention is applicable.

FIGS. 14A-B illustrate an RM state model to which the present invention may be applied.

DETAILED DESCRIPTION

Figure 1:
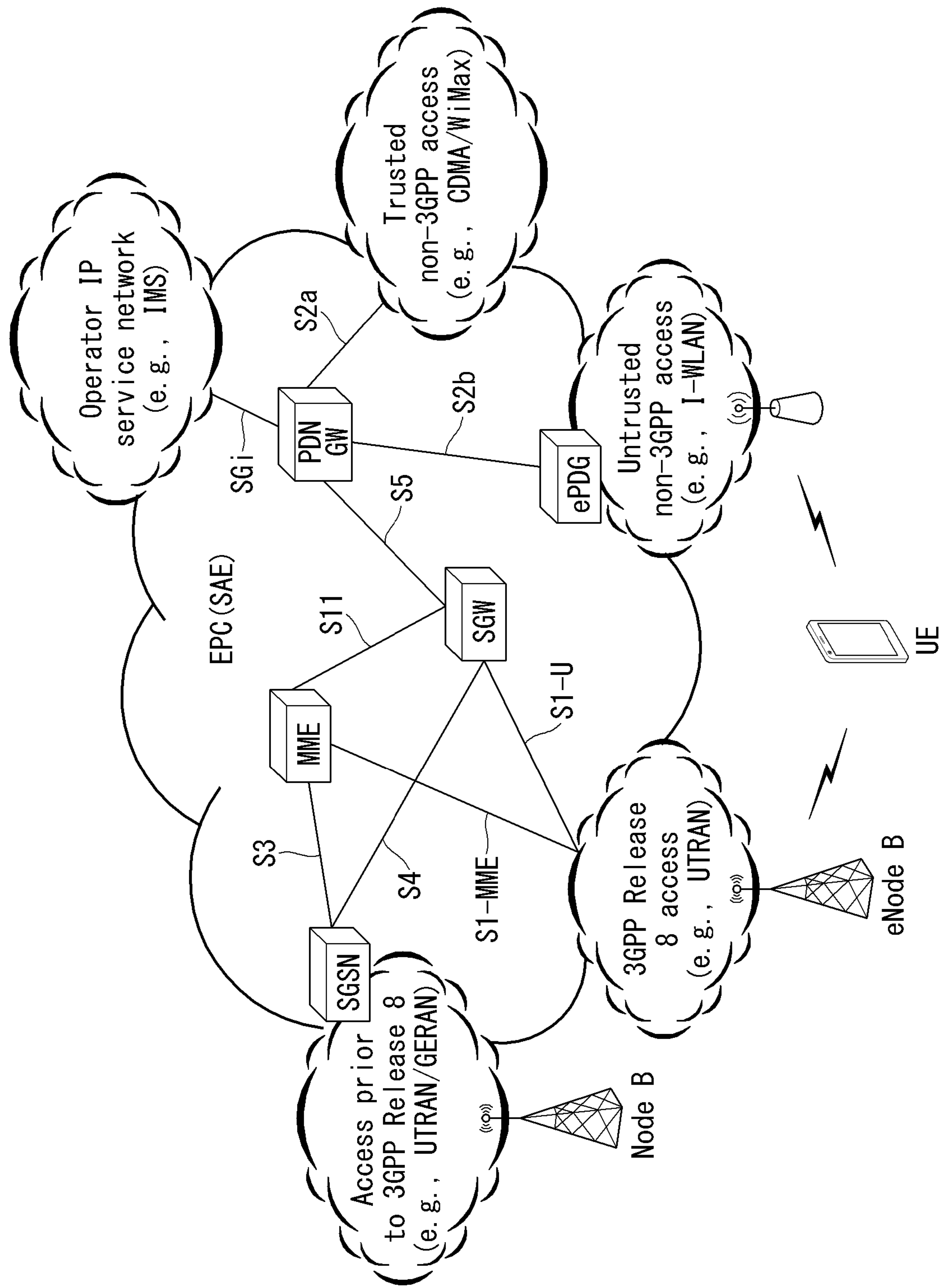
FIG. 1 illustrates an Evolved Packet System (EPS) to which the present invention can be applied.

The present invention proposes a method for efficiently performing an interworking procedure between an EPC and a 5G core in a wireless communication system. In particular, the present invention proposes a solution in terms of a network node in order to reduce the load imposed on a user equipment (UE) in the interworking procedure.

There is provided an embodiment of a method and an apparatus for solving the above technical problems. It is to be understood that both the foregoing general description and the following detailed description are exemplary and explanatory and are not to be construed as limiting the invention as defined by the appended claims and their equivalents.

Technical Solution

According to an aspect of the present invention, there is provided an interworking method between networks of a user equipment (UE) in a wireless communication system, including: performing a first interworking procedure for changing the network of the user equipment from a 5-generation core network (5GC) network to an evolved packet core (EPC) network, wherein the performing of the first interworking procedure includes, if an interface between the 5GC and the EPC network does not exist: receiving a first instruction from an access and mobility management function (AMF) of the 5GC network; and performing a handover access procedure within the EPC network based on the first instruction.

The performing of the first interworking procedure may include, if the interface between the 5GC and the EPC network exists: not receiving the first instruction from the AMF; and performing a tracking area update (TAU) procedure within the EPC network.

A packet data unit (PDU) session generated for the user equipment within the 5GC may be transferred to the EPC network through the handover access procedure or the TAU procedure.

The performing of the handover access procedure may include: transmitting a PDN connection request message in which a request type is set to a handover, to an mobility management entity (MME) of the EPC.

The interworking method may further include: transmitting, to the MME, information indicating that the user equipment moves from the 5GC.

The EPC may have an EPC-GUTI (globally unique temporary user equipment identity) mapped with the GUTI of the 5GC.

The interworking method may further include, if the interface between the 5GC and the EPC network does not exist and the user equipment is in a connected mode in the 5GC: performing radio resource control (RRC) release with a NG (next-generation)-RAN (radio access network) of the 5GC and camping on a cell connected to the EPC.

The interworking method may further include: performing a second interworking procedure for changing the network of the user equipment from the EPC network to the 5GC network, wherein the performing of the second interworking procedure includes, if the interface between the 5GC and the EPC network does not exist: receiving a second instruction from a mobility management entity (MME) of the EPC network; and performing a registration procedure within the 5GC network based on the second instruction.

A packet data unit (PDU) session generated for the user equipment within the EPC may be transferred to the 5GC network through the registration procedure.

The registration procedure may be a registration procedure in which a registration type is set to a mobility registration update.

The interworking method may further include: transmitting, to the AMF, information indicating that the user equipment is moved from the EPC.

The 5GC may have a 5GC-GUTI (globally unique temporary user equipment identity) mapped with the GUTI of the EPC.

The interworking method may further include, if the interface between the 5GC and the EPC network does not exist and the user equipment is in a connected mode in the 5GC: performing radio resource control (RRC) release with an E-UTRAN (evolved universal terrestrial radio access network) of the EPC.

According to another aspect of the present invention, there is provided a user equipment (UE) for performing an interworking method between networks in a wireless communication system, including: a communication module configured to transmit and receive signals; and a processor configured to control the communication module, wherein the processor performs a first interworking procedure for changing the network of the user equipment from a 5-generation core network (5GC) network to an evolved packet core (EPC) network, wherein, if an interface between the 5GC and the EPC network does not exist, the user equipment: receives an instruction from an access and mobility management function (AMF) of the 5GC network; and performs a handover access procedure within the EPC network based on the instruction.

If the interface between the 5GC and the EPC network exists, the processor may not receive the instruction from the AMF and may perform a tracking area update (TAU) procedure within the EPC.

Mode for Invention

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of system to which the present invention can be applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
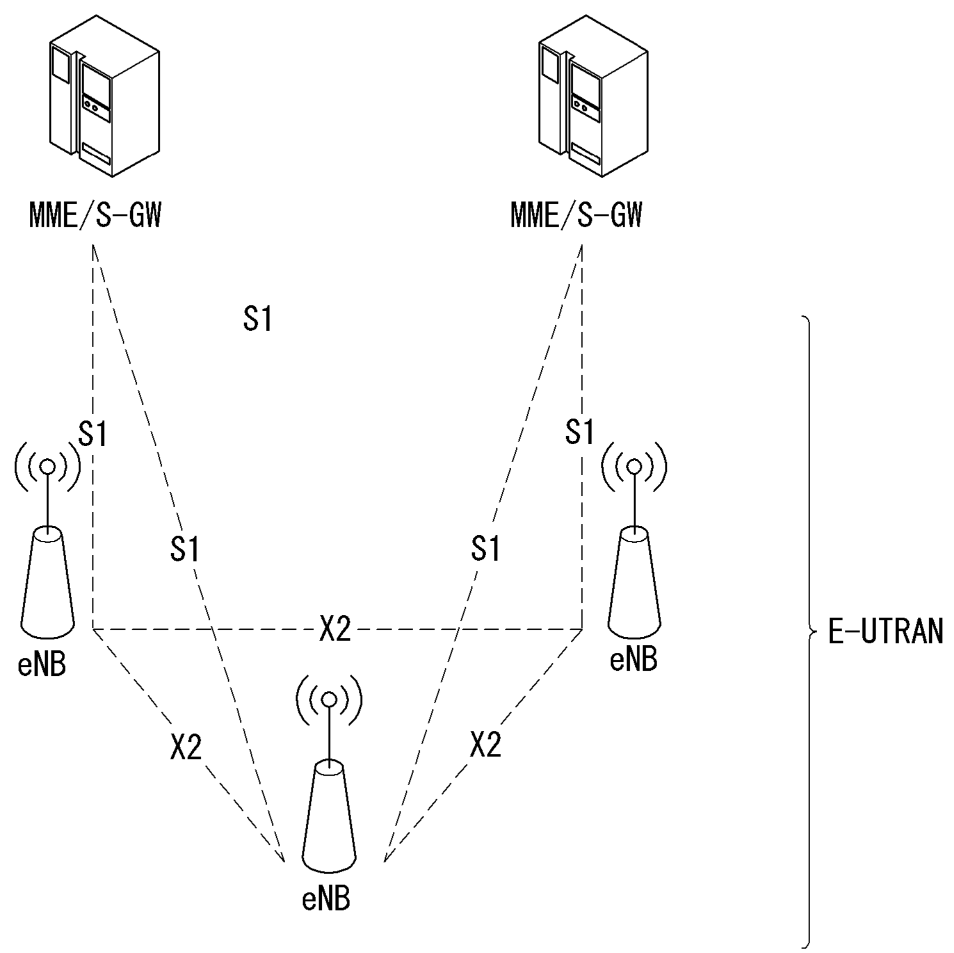
FIG. 2 illustrates one example of an Evolved Universal Terrestrial Radio Access Network (E-UTRAN) to which the present invention can be applied.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
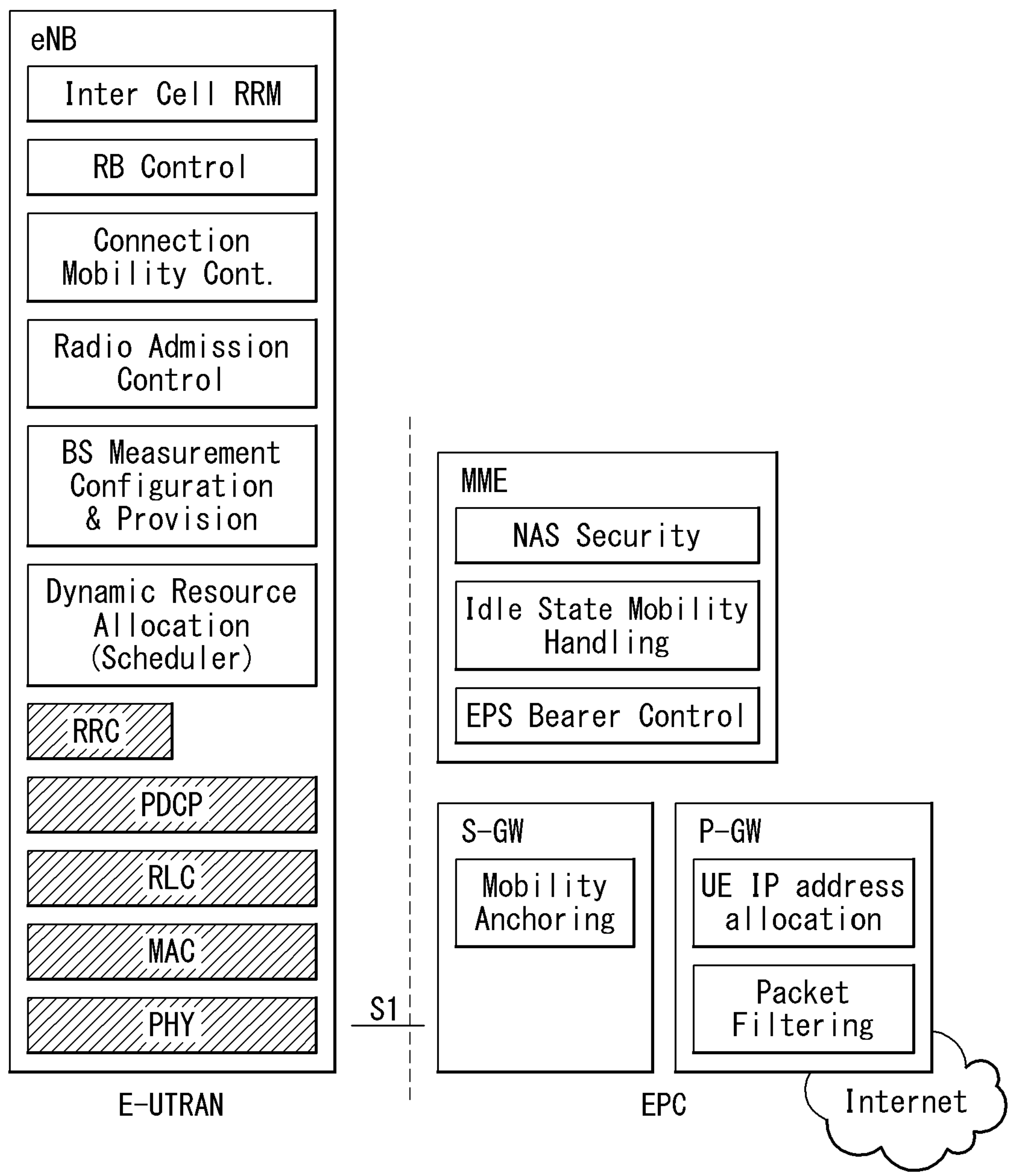
FIG. 3 illustrates structures of an E-UTRAN and an EPC in a wireless communication system to which the present invention may be applied.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIGS. 4A-B illustrates a radio interface protocol structure between a UE and an E-UTRAN in a wireless communication system to which the present invention can be applied.

FIG. 4A illustrates a radio protocol structure for the control plane, and FIG. 4B illustrates a radio protocol structure for the user plane.

With reference to FIGS. 4A-B, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIGS. 5A-B illustrate an S1 interface protocol structure in a wireless communication system to which the present invention can be applied.

FIG. 5A illustrates the control plane protocol stack in the S1 interface, and FIG. 5B illustrates the user plane interface protocol structure in the S1 interface.

With reference to FIGS. 5A-B, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1 AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
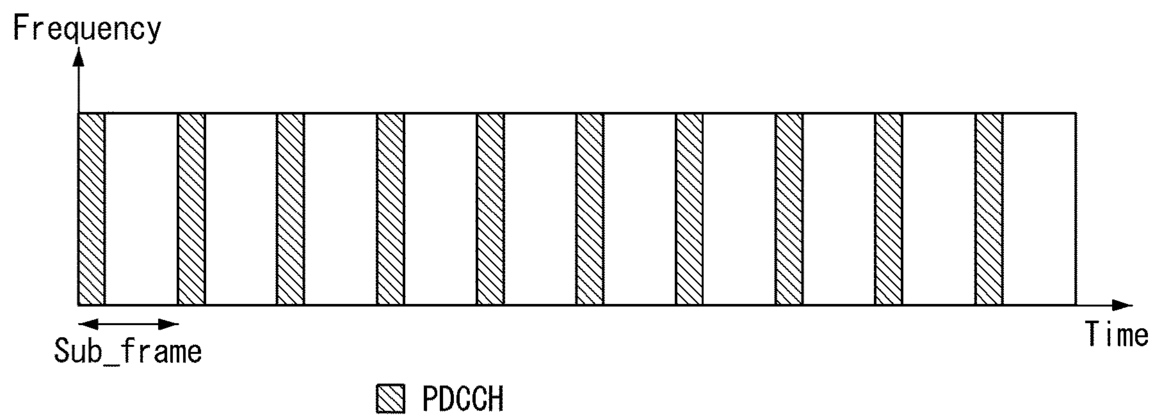
FIG. 6 illustrates a physical channel structure in a wireless communication system to which the present invention may be applied.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM state

In what follows, EPS Mobility Management (EMM) and EPS Connection Management (ECM) states will be described.

Figure 7:
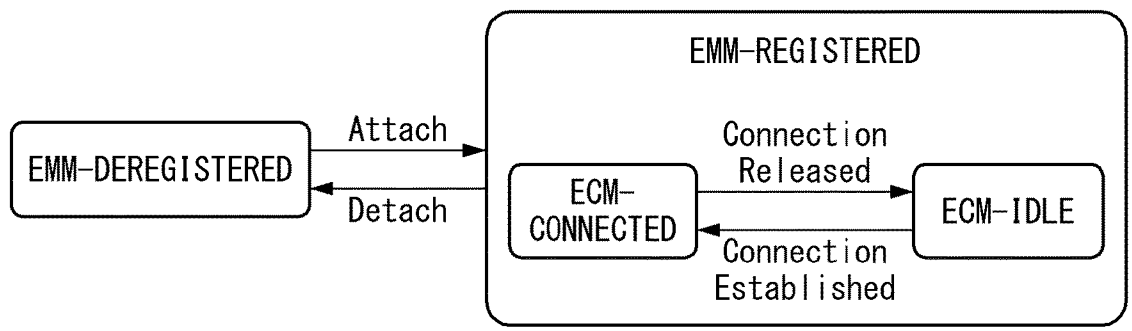
FIG. 7 illustrates an EMM and ECM states in a wireless communication system to which the present invention may be applied.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC CONNECTED state. If the RRC layer of the UE is not connected to the RRC layer of the eNB, the UE stays in the RRC IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

Figure 8:
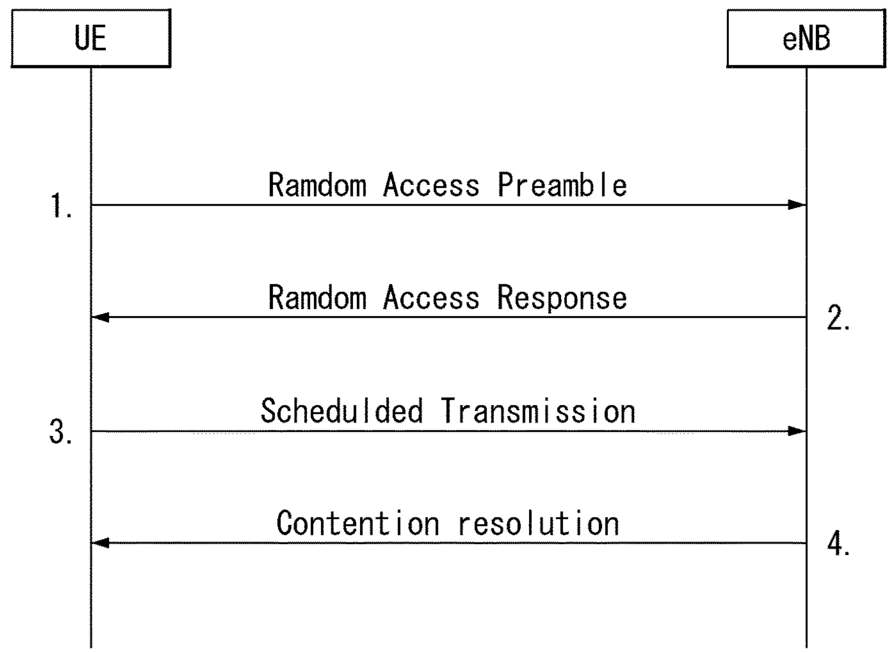
FIG. 8 illustrates a contention-based random access procedure in a wireless communication system to which the present invention may be applied.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits aMsg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Figure 11:
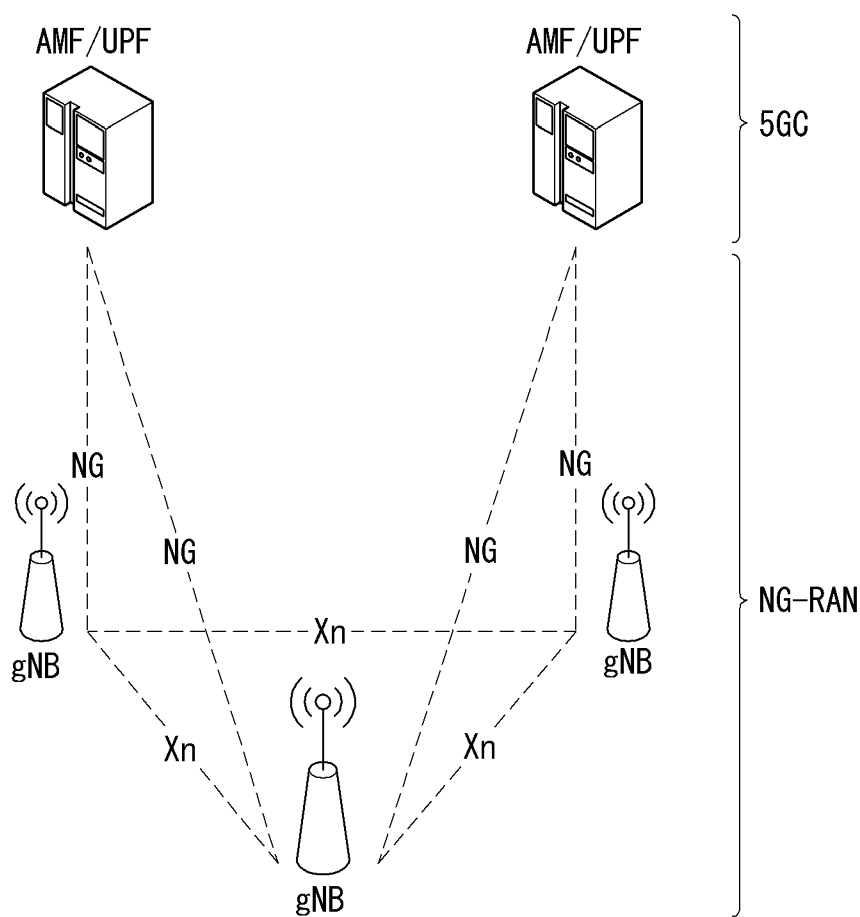
FIG. 11 illustrates an NG-RAN architecture to which the present invention may be applied.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G system architecture to which the present invention may be applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

- Reference point representation (FIG. 9): indicates an interaction between NF services within NFs described by a point-to-point reference point (e.g., N11) between two NFs (e.g., AMF and SMF).
- Service-based representation (FIG. 10): network functions (e.g., AMFs) within a control plane (CP) permit other authenticated network functions to access its own service. If this representation is necessary, it also includes a point-to-point reference point.

Figure 9:
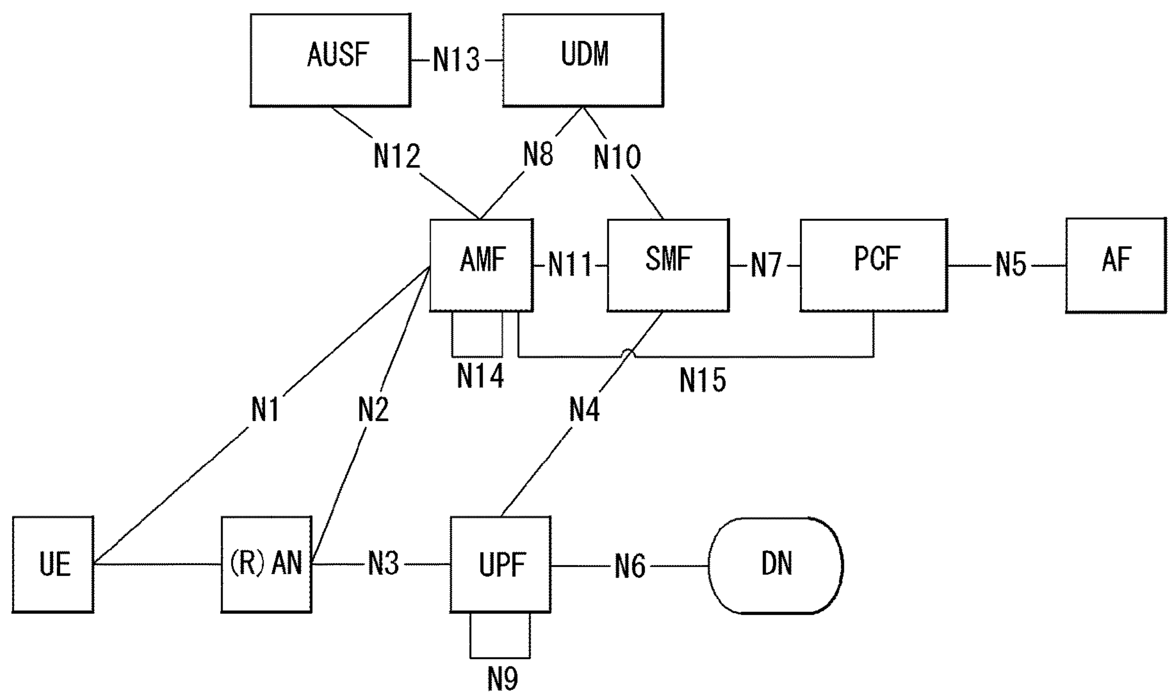
FIG. 9 illustrates a 5G system architecture using reference point representation.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF(SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF

N2: a reference point between an (R)AN and an AMF

N3: a reference point between an (R)AN and a UPF

N4: a reference point between an SMF and a UPF

N5: a reference point between a PCF and an AF

N6: a reference point between a UPF and a data network

N7: a reference point between an SMF and a PCF

N24: a reference point between a PCF within a visited network and a PCF within a home network N8: a reference point between a UDM and an AMF N9: a reference point between two core UPFs N10: a reference point between a UDM and an SMF N11: a reference point between an AMF and an SMF N12: a reference point between an AMF and an AUSF N13: a reference point between a UDM and an authentication server function (AUSF)

N14: a reference point between two AMFs

N15: a reference point between a PCF and an AMF in the case of a non-roaming scenario and a reference point between a PCF within a visited network and an AMF in the case of a roaming scenario N16: a reference point between two SMFs (in the case of a roaming scenario, a reference point between an SMF within a visited network and an SMF within a home network)

N17: a reference point between an AMF and an EIR

N18: a reference point between any NF and an UDSF

N19: a reference point between an NEF and an SDSF

Figure 10:
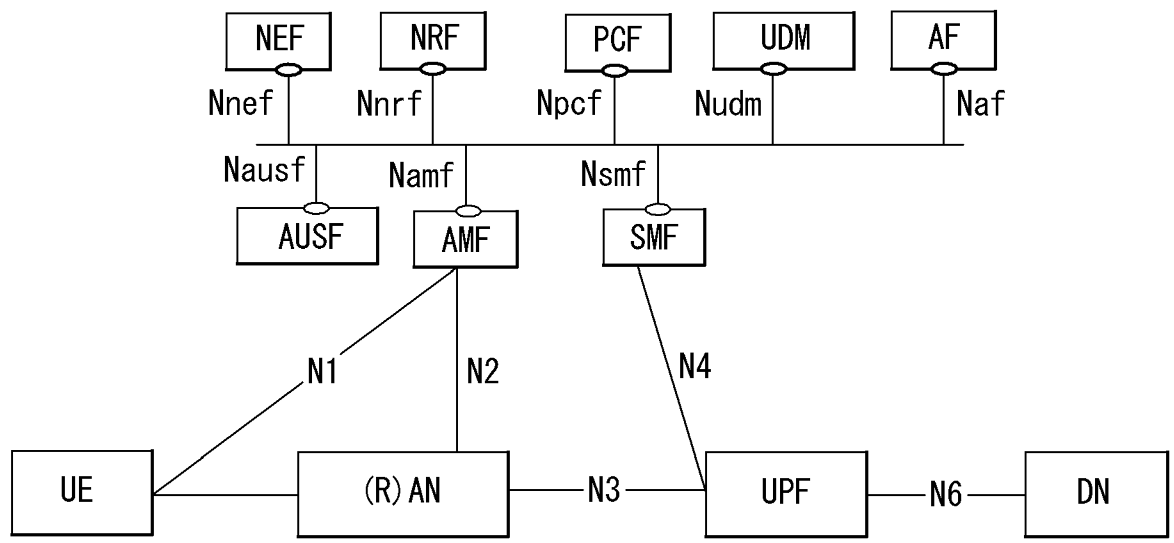
FIG. 10 illustrates a 5G system architecture using a service-based representation.

FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF

Nsmf: a service-based interface exhibited by an SMF

Nnef: a service-based interface exhibited by an NEF

Npcf: a service-based interface exhibited by a PCF

Nudm: a service-based interface exhibited by a UDM

Naf: a service-based interface exhibited by an AF

Nnrf: a service-based interface exhibited by an NRF

Nausf: a service-based interface exhibited by an AUSF

NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the present invention may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

Figure 12A:
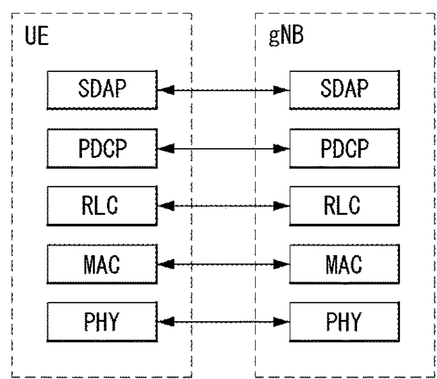
FIGS. 12A-B illustrate a wireless protocol stack to which the present invention may be applied.
Figure 12B:
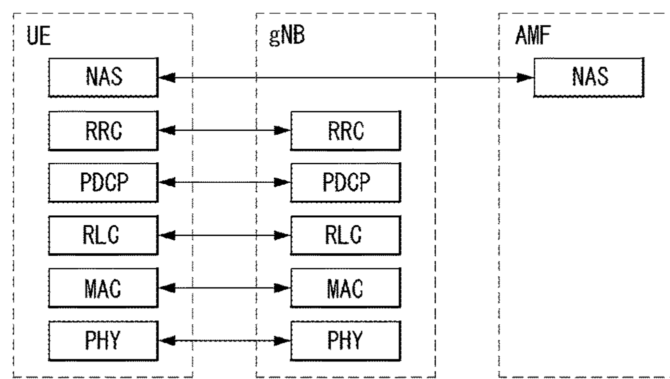

FIGS. 12A-B is a diagram illustrating a radio protocol stack to which the present invention may be applied. Specifically, FIG. 12A illustrates a radio interface user plane protocol stack between a UE and a gNB, and FIG. 12B illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12A, the user plane protocol stack may be divided into a first layer (Layer 1) (i.e., a physical layer (PHY) layer) and a second layer (Layer 2).

Referring to FIG. 12B, the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

FIG. 13 illustrates a protocol stack between a UE and a core network of 5G/NR system to which the present invention is applicable.

N1 may play a role similar to a NAS protocol of EPS, and N2 may play a role similar to S1-AP of EPS. 5G RRC and 5G AS respectively correspond to existing LTE RRC and LTE AS, or NR RRC and NR AS of NR that are newly being standardized, and RRCs of all two RATs are excepted to be based on current LTE RRC.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

- Core network control plane and user plane function
- NG-RAN
- Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

- Slice/service type (SST): the SST indicates the operation of a network slice expected form a viewpoint of a function and service.
- Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(s) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 13 illustrates RM state models to which the present invention may be applied. Specifically, FIG. 13(*a*) shows an RM state model within a UE, and FIG. 13(*b*) shows an RM state model within an AMF.

Referring to FIG. 13, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIGS. 14A-B illustrate CM state models to which the present invention may be applied. Specifically, FIG. 14A illustrates a CM state shift within a UE, and FIG. 14B shows a CM state shift within an AMF.

Referring to FIGS. 14A-B, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

- In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.
- In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

- In the CM-CONNECTED state, whenever an N2 signaling connection and N3 connection for the UE are released, the AMF enters the CM-IDLE state.
- When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

- If an RRC resumption procedure fails,
- If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

- RAT restriction: the RAT restriction is defined as a 3GPP RAT(s) whose access of a UE is not permitted. A UE within a restricted RAT is not allowed to initiate any communication with a network based on subscription information.
- Forbidden area: a UE is not allowed to initiate any communication with a network based on subscription information within a forbidden area under a specific RAT.
- Service area restriction: it defines an area in which a UE can initiate cannot initiate communication with a network as follows:
- Allowed area: if a UE is allowed by subscription information within an allowed area under a specific RAT, the UE is allowed to initiate communication with a network.
- Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

- The evaluation of the RAT restriction has precedence over the evaluation of any other mobility restriction;
- The evaluation of the forbidden area has precedence over the evaluation of the allowed area and the non-allowed area; and
- The evaluation of the non-allowed area has precedence over the evaluation of the allowed area.

4) Mobile Initiated Connection only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

- If a change (e.g., configuration change) within the UE requires registration update to a network
- If a periodic registration timer expires
- If MO data is pending
- If MO(Mobile Originating) signaling is pending Quality of Service (QoS) model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:

- QoS profile previously configured in the AN or provided from the SMF to the AN via the AMF through the N2 reference point;
- One or more networks provided from the SMF to the UE via the AMF through the N1 reference point—provided QoS rule(s) and/or one or more UE-derived QoS rule(s)
- SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

- 5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).
- Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:

- GFBR—the uplink and downlink;
- Maximum flow bit rate (MFBR)—the uplink and downlink; and
- Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) should be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

Figure 15A:
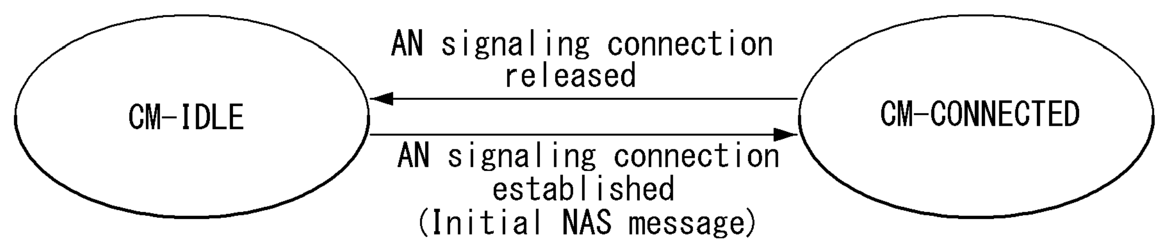
FIGS. 15A-B illustrate a CM state model to which the present invention may be applied.
Figure 15B:
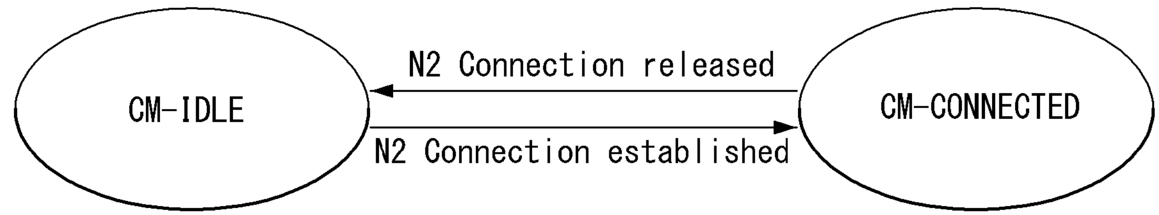
Figure 16:
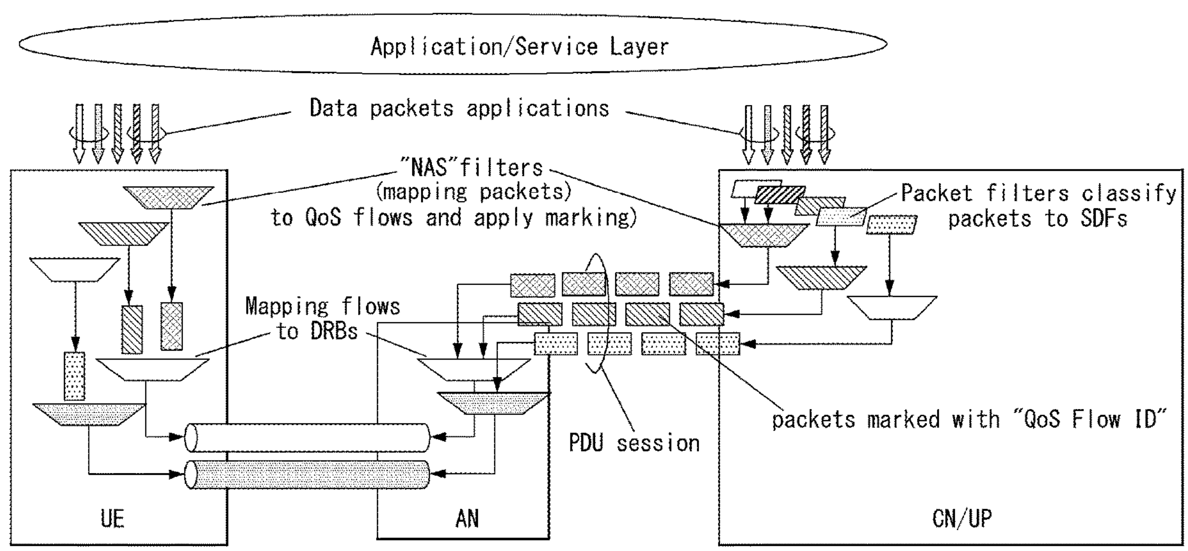
FIG. 16 illustrates a classification and user plane marking for a QoS flow and a mapping of QoS flows to AN resources according to an embodiment of the present invention.

FIGS. 15A-B illustrate classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow.

Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffSery code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.

The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.

The (R)AN may perform transmission level packet marking in the uplink. The transmission level packet marking may be based on the ARP of a QoS flow associated with a 5QI.

A UPF checks whether the QFIs of UL PDUs are provided to the UE or are aligned (e.g., in the case of reflective QoS) with QoS rules implicitly derived by the UE.

The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

MM/SM Separation

In a core network of 5th generation system (5GS), a network node (AMF) managing a mobility and a network node (SMF) managing a session have been divided as separate functions. If MME has played a main role of a control plane in the existing EPC, etc., entity/node has been modularized and divided per main function in 5GC. That is, in the 5GS, it may be considered that the existing MME has been divided into an AMF responsible for a mobility management function and a SMF responsible for a session management function.

The SMF managing each session is responsible for SM related NAS layer message and procedure, and the AMF is responsible for an overall mobility management (MM) including a registration management (RM) and a connection management (CM) of the UE itself. The roles of the AMF and the SMF currently defined in TS 23.501 are as follows.

1. AMF

The AMF includes the following functionality. Some or all of the AMF functionalities may be supported in a single instance of the AMF:

- Termination of RAN CP interface (N2)
- Termination of NAS (N1), NAS ciphering and integrity protection
- Registration management
- Connection management
- Reachability management
- Mobility management
- Lawful intercept (for AMF events and interface to LI System)
- Transparent proxy for routing SM messages
- Access authentication
- Access authorization
- Security Anchor Function (SEA): The SEA interacts with the AUSF and the UE and receives an intermediate key that is established as a result of the UE authentication process. In case of USIM based authentication, the AMF retrieves the security material from the AUSF.
- Security Context Management (SCM): The SCM receives a key from the SEA that it uses to derive access-network specific keys.

Regardless of the number of network functions, there is only one NAS interface instance per access network between the UE and the CN, and terminated at one of the Network functions that implements at least NAS security and mobility management.

In addition to the functionalities of the AMF described above, the AMF may include the following functionality to support non-3GPP access networks:

- Support of N2 interface with N3IWF. Over this interface, some information (e.g., 3GPP cell identification) and procedures (e.g., hand-over related) defined over 3GPP access may not apply, and non-3GPP access specific information may be applied that do not apply to 3GPP accesses.
- Support of NAS signaling with a UE over N3IWF. Some procedures supported by NAS signaling over 3GPP access may be not applicable to untrusted non-3GPP (e.g., paging) access.
- Support of authentication of UEs connected over N3IWF.
- Management of mobility and authentication/security context state(s) of a UE connected via non-3GPP access or connected via 3GPP and non-3GPP accesses simultaneously.
- Support of a co-ordinated RM management context valid over 3GPP and non-3GPP accesses.
- Support of dedicated CM management contexts for the UE for connectivity over non-3GPP access.

Not all of the functionalities are required to be supported in an instance of a network slice.

2. SMF

The session management function (SMF) includes the following functionality. Some or all of the SMF functionalities may be supported in a single instance of a SMF:

- Session management (e.g., session establishment, modification, and release, including tunnel maintenance between the UPF and an AN node.
- UE IP address allocation and management (including optional authorization).
- Selection and control of UP function.
- Configuring traffic steering at UPF to route traffic to proper destination.
- Termination of interfaces towards policy control functions.
- Controlling part of policy enforcement and QoS.
- Lawful intercept (for SM events and interface to LI System).
- Termination of SM parts of NAS messages.
- Downlink data notification.
- Initiator of AN specific SM information, sent via AMF over N2 to AN.
- Determining SSC mode of a session (for IP type PDU session)
- Roaming functionality:
- Handling local enforcement to apply QoS SLAB (VPLMN).
- Charging data collection and charging interface (VPLMN).
- Lawful intercept (in VPLMN for SM events and interface to LI System).

Support for interaction with external DN for transport of signaling for PDU session authorization/authentication by external DN.

Not all of the functionalities are required to be supported in an instance of a network slice.

In order to start a SM procedure, in the same manner as the existing procedure, a CM-CONNECTED state, i.e., secure signaling connection between the UE and the CN should be necessarily established. A SM NAS message shall go through the AMF, but the SM NAS message is transparent to the AMF. That is, the AMF cannot decrypt or recognize the contents of the SM NAS message itself passing through the AMF. Thus, if there are several SMFs, the AMF needs to be separately instructed as to which SMF forwards/routes the NAS message. To this end, information for separate forwarding/routing may be added to the outside of the SM NAS message.

If a PDU session has been already created, a PDU session ID of the corresponding PDU session may be represented in a part (particularly, outside the SM NAS message) that the AMF can decrypt, and the AMF can find/recognize the SMF to forward/route the message based on this. In this instance, a mapping table scheme, etc. may be used. If a PDU session is not created, the AMF may perform a SMF selection function in consideration of information such as DNN and S-NSSAI, in order to select an appropriate SMF. Information that is used for the AMF to select the appropriate SMF may be represented, by the UE, in the part that the AMF can decrypt/recognize and may be provided to the AMF.

Registration Procedure

In 5GS, the existing Attach procedure and TAU procedure have been combined and defined as a registration procedure. However, the registration procedure may be divided into/ called an initial registration (Attach) procedure, a registration update (TAU) procedure, a periodic registration update (p-TAU) procedure, etc. depending on its purpose.

Whether session establishment can be performed during the registration procedure is currently under discussion, and there may be a method for entering an SM procedure immediately after an RM procedure is ended, and a method for piggybacking and sending an SM message in the same manner as EPC technology.

Figure 17:
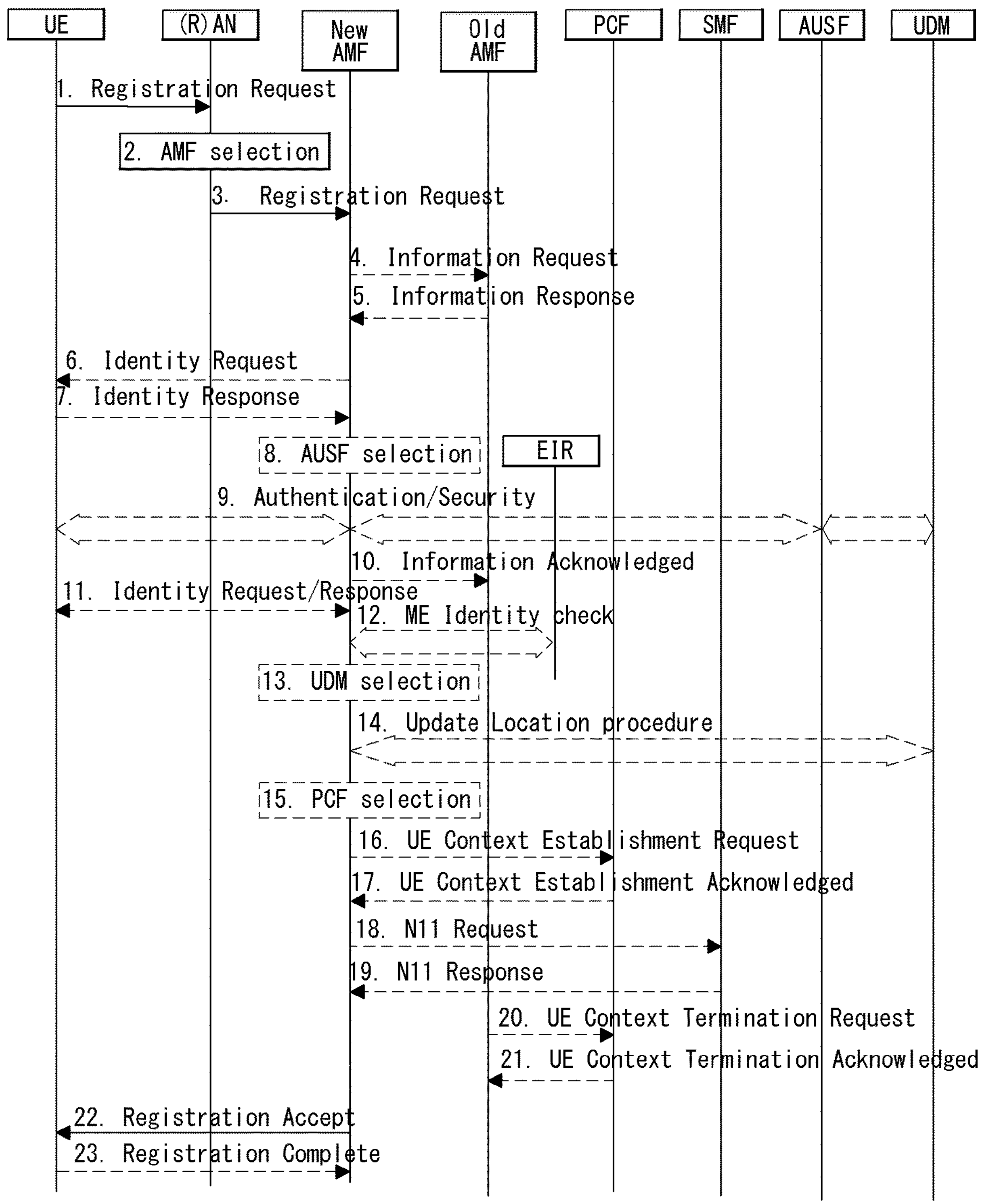
FIG. 17 is a flow chart illustrating a registration procedure applicable to the present invention.

A registration procedure currently reflected in TS 23.502 v0.2.0 is as the following FIG. 17.

FIG. 17 is a flow chart illustrating a registration procedure applicable to the present invention.

1. UE to (R)AN: AN message (AN parameters, registration request (registration type, subscriber permanent identifier (SUPI) or temporary user ID, security parameters, NSSAI, UE 5GCN capability, PDU session status)).

In case of 5G-RAN, the AN parameters include, for example, the SUPI or the temporary user ID, the selected network and/or NSSAI.

The registration type may indicate if the UE wants to perform an "initial registration (i.e. the UE is in a non-registered state)", a "mobility registration update (i.e. the UE is in a registered state and initiates a registration procedure due to mobility)" or a "periodic registration update (i.e. the UE is in a registered state and initiates a registration procedure due to the periodic update timer expiry)". If included, the temporary user ID indicates the last serving AMF. If the UE is already registered via a non-3GPP access in a PLMN different from the PLMN of the 3GPP access, the UE shall not provide the UE temporary ID allocated by the AMF during the registration procedure over the non-3GPP access.

The security parameters are used for authentication and integrity protection. NSSAI indicates network slice selection assistance information. The PDU session status indicates the available (previously established) PDU sessions in the UE.

2. If a SUPI is included or the temporary user ID does not indicate a valid AMF, the (R)AN, based on (R)AT and NSSAI, if available, selects an AMF. The (R)AN selects an AMF as described in TS 23.501. If the (R)AN cannot select an AMF, it forwards the registration request to a default AMF. The default AMF is responsible for selecting an appropriate AMF for the UE. The relocation between the default AMF and the selected AMF is described in clause 4.2.2.2.3, where the initial AMF refers to the default AMF, and the target AMF refers to the selected AMF.

3. (R)AN to AMF: N2 message (N2 parameters, registration request (registration type, subscriber permanent identifier or temporary user ID, security parameters, NSSAI)).

When 5G-RAN is used, the N2 parameters include location information, cell identity and RAT type related to the cell in which the UE is camping.

If the registration type indicated by the UE is periodic registration update, the steps 4 to 17 may be omitted.

4. [conditional] new AMF to old AMF: Information Request (complete registration request)

If the UE's temporary user ID is included in the registration request and the serving AMF has changed since last registration, the new AMF may send information request to old AMF including the complete registration request IE to request the UE's SUPI and MM context.

5. [conditional] old AMF to new AMF: Information Response (SUPI, MM context, SMF information). The Old AMF responds with information response to new AMF including the UE's SUPI and MM Context. If old AMF holds information about active PDU sessions, the old AMF includes SMF information including SMF identities and PDU session identities.

6. [conditional] AMF to UE: Identify Request ( ).

If the SUPI is not provided by the UE nor retrieved from the old AMF the identity request procedure is initiated by AMF sending an identity request message to the UE.

7. [conditional] UE to AMF: Identify Request ( ).

The UE responds with an Identity response message including the SUPI.

8. The AMF may decide to invoke an AUSF. In this case, the AMF may select an AUSF based on SUPI.

9. The AUSF shall initiate authentication of the UE and NAS security functions.

A procedure including AMF relocation (e.g., due to network slicing) may happen after step 9.

10. [conditional] new AMF to old AMF: Information Acknowledged ( ).

If the AMF has changed, the new AMF acknowledges the transfer of UE MM context. If the authentication/security procedure fails, the registration is rejected, and the new AMF sends a reject indication to the old AMF. The old AMF continues the procedure as if the information request was never received.

11. [conditional] AMF to UE: Identity Request ( ).

If the PEI was not provided by the UE nor retrieved from the old AMF, the identity request procedure is initiated by sending, by the AMF, an identity request message to the UE to retrieve the PEI.

12. Optionally, the AMF initiates ME identity. The PEI check is performed as described in clause 4.7.

13. If step 14 is to be performed, the AMF selects a UDM based on the SUPI.

The AMF selects an UDM as described in TS 23.501.

14. If the AMF has changed since the last registration, or if there is no valid subscription context for the UE in the AMF, or if the UE provides a SUPI which does not refer to a valid context in the AMF, the AMF can initiate an update location procedure. This includes that the UDM initiates cancel location to the old AMF, if any. The old AMF removes the MM context and notifies all possibly associated SMF(s), and the new AMF can create an MM context for the UE after getting the AMF related subscription data from the UDM. The update location procedure is performed according to TS 23.501.

The PEI is provided to the UDM in the update location procedure.

15. Conditionally, the AMF selects a PCF based on the SUPI. The AMF selects a PCF as described in TS 23.501[2].

16. [optional] AMF to PCF: UE Context Establishment Request ( ).

The AMF request the PCF to apply operator policies for the UE.

17. PCF to AMF: UE Context Establishment Acknowledged ( ).

The PCF acknowledges the UE context establishment request message.

18. [conditional] AMF to SMF: N11 Request ( ).

If the AMF is changed, the new AMF notifies each SMF of the new AMF serving the UE.

The AMF verifies a PDU session status from the UE with the available SMF information. In case the AMF has changed, the available SMF information has been received from the old AMF. The AMF may request the SMF to release all network resources related to PDU sessions that are not active in the UE.

19. SMF to AMF: N11 Response ( ).

The SMF may decide to trigger, for example, UPF relocation. If the registration type indicated by the UE is periodic registration update, steps 20 and 21 may be omitted.

20. [conditional] AMF to PCF: UE Context Termination Request ( ).

If the old AMF previously requested UE context to be established in the PCF, the old AMF terminates the UE context in the PCF.

21. AMF to PCF: UE Context Termination Acknowledged ( ).

22. AMF to UE: Registration Accept (temporary user ID, registration area, mobility restrictions, PDU session status, NSSAI, periodic registration update timer).

The AMF sends a registration accept message to the UE indicating that the registration has been accepted. A temporary user ID is included if the AMF allocates a new temporary user ID. Mobility restrictions are included in case mobility restrictions apply for the UE. The AMF indicates the PDU session status to the UE. The UE removes any internal resources related to PDU sessions that are not marked with active in the received PDU session status. If the PDU session status information was in the registration request, the AMF shall indicate the PDU session status to the UE. The NSSAI includes the accepted S-NSSAIs.

23. [conditional] UE to AMF: Registration Complete ( ).

The UE sends a registration complete message to the AMF to acknowledge if a new temporary user ID was assigned.

Hereinafter, a registration procedure with AMF relocation is described.

Figure 18:
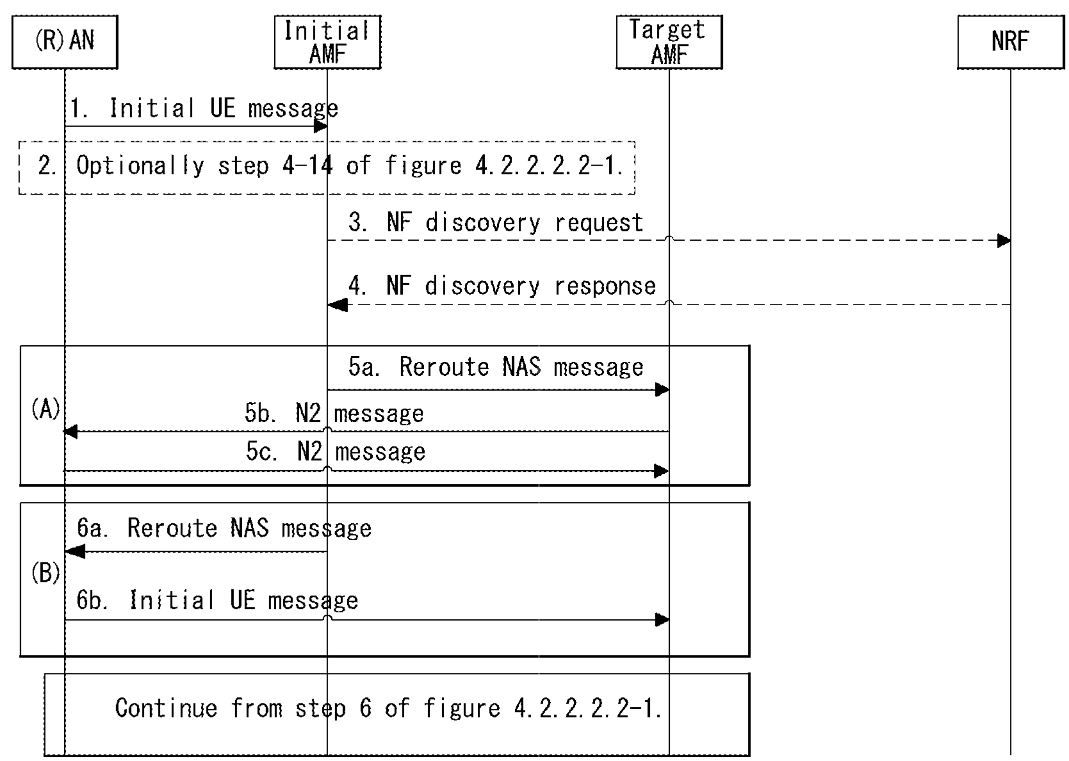
FIG. 18 is a flow chart illustrating a NAS message redirection procedure to which the present invention is applicable.

FIG. 18 is a flow chart illustrating a NAS message redirection procedure to which the present invention is applicable.

When an AMF receives a registration request, the AMF may need to reroute the registration request to another AMF (e.g., due to that network slicing is used and the initial AMF is not the appropriate AMF to serve the UE). The registration with AMF relocation procedure, illustrated in FIG. 18, is used to reroute the NAS message of the UE to the target AMF during a registration procedure.

A first AMF and a second AMF register its capability at the NRF.

1. Step 1 and 2 of FIG. 4.2.2.2.2-1 of TS 23.501 has occurred, and the (R)AN sends the registration request message within an initial UE message to the initial AMF.

2. If the AMF needs the SUPI and/or UE's subscription information to decide whether to reroute the registration request or if the registration request was not sent integrity protected or integrity protection is indicated as failed, the AMF can perform step 4 to 14 of FIG. 4.2.2.2.2-1.

3. [conditional] AMF to NRF: NF Discovery Request (NF type).

The initial AMF decides to reroute the NAS message to another AMF. If the initial AMF does not locally store a target AMF address, the initial AMF sends an NF discovery request to the NRF to find a proper target AMF which has required NF capabilities to serve the UE. The NF type is set to AMF.

4. NRF to AMF: NF Discovery Response (list of AMFs, NF capabilities).

The NRF replies with a set of potential target AMFs and their capabilities. Based on the information about registered NFs and required capabilities, a target AMF is selected by the initial AMF.

5. If the initial AMF, based on local policy and subscription information, determines to directly forward the NAS message to the target AMF, the initial AMF may send a reroute NAS message to the target AMF. The reroute NAS message includes information enabling (R)AN to identify the N2 terminating point and the NAS message carried at step 1, and optionally includes the UE's SUPI and MM context. If network slicing is used and the initial AMF updates the NSSAI at step 1, the updated NSSAI is included. The target AMF then updates the (R)AN with a new updated N2 termination point for the UE (step 5b), and the (R)AN acknowledges the updated N2 termination point (step 5c). Step 5 may be skipped.

Steps 5b and 5c can occur separately or as part of the first subsequently required N2 interaction.

6. If the initial AMF, based on local policy and subscription information, determines to forward the NAS message to the target AMF via RAN, the initial AMF sends a reroute NAS message to the RAN (step 6a). The Reroute NAS message includes the information about the target AMF and the registration request message carried at step 1, and optionally includes the UE's SUPI and MM context. If network slicing is used and the initial AMF updates the NSSAI at step 1, the updated NSSAI is included in the reroute NAS message. The RAN sends the Initial UE message to the target AMF (step 6b).

7. After receiving the registration request message transmitted at step 5a or step 6b, the target AMF continues with the registration procedure (with the target AMF corresponding to the new AMF).

Interaction Control Method between MM and SM

A SM NAS message sent by a UE shall always go through an AMF so that the SM NAS message is sent to a SMF. Thus, the SM message may be sent by being attached or piggybacked to a MM or RM message. This is similar to that a PDN connectivity request message, that is an ESM message, is sent by being piggybacked to an attach request message that is an EMM message in EPC. In 5GC, a registration procedure similar to an Attach is defined. A PDU session establishment related message may be or may not be piggybacked to a registration message.

If the SM message is sent by being piggybacked to the MM message (if the SM message is sent to an initial message), the following problems may be caused.

1) Problem 1

In an initial registration or attach process, if a SM request message for PDU session establishment/change, etc. is forwarded together, the UE may include the following information in a registration request message (or, referred to as UL NAS message).

[Registration Request Message]

SM message container: PDU session establishment request (DNN, S-NSSAI(1))

SM routing information: S-NSSAI(2) and/or DNN

Requested NSSAI: Set of S-NSSAI(3)

Here, S-NSSAI ((1) and (2)) included in SM related items may be S-NSSAI requested by PDU session, and S-NSSAI (3) included in requested NSSAI may be S-NSSAIs that has to be considered upon registration request. That is, the S-NSSAIs ((1) and (2)) included in the SM may be a subset of the requested NSSAI. The S-NSSAIs ((1) and (2)) each may be defined as a single parameter, have the same value, and may be included in the requested NSSAI.

The AMF may consider information such as DNN, S-NSSAI, etc. when selecting an appropriate SMF through a SMF selection function, and the UE may represent the information on the part that the AMF can decipher/recognize, and may provide it to the AMF.

2) Problem 1-1. Handling of SM message piggybacked upon RM/MM rejection—if registration itself is rejected In the registration procedure, the AMF may reject a registration request of the UE for various reasons. In this case, the AMF may send a reject message (i.e., registration reject) to the registration request to the UE.

However, unlike the conventional EPC, etc. in which SM and MM were managed/handled in MME that is one entity, in 5GC, SM and MM have been defined to be respectively managed/handled in the SMF and the AMF that are separated from each other. Therefore, even if the UE receives a reject message from the AMF responsible for the managing/handling the MM, the UE cannot know whether to accept/reject the SM message that has been sent upon registration request. That is, the registration request of the UE is sent to the SMF via the AMF, but if a reject of the registration request is decided at the AMF, the SM message included in the corresponding registration request is not forwarded to the SMF enabling to handle a response. As a result, a problem arises that the UE cannot receive a response to the SM message.

3) Problem 1-2. Handling when RM/MM has been accepted, but a specific service has been rejected—if a registration has been accepted, but services related to a specific session are rejected A UE and a network using network slicing request services (or slices) in a registration process and go through an accept process. The network shall include, in an accept message, S-NSSAI corresponding to service/slice information requested from the UE through RM request (registration request), i.e., allowable service/slice information after checking S-NSSAI included in requested NSSAI. In this instance, the S-NSSAI corresponding to the allowable/acceptable service/slice information may be referred to as allowed NSSAI or accepted NSSAI.

As described above, the network may allow/accept only part of service/slice requested by the UE or reject only part. In this instance, the network can handle the registration request of the UE if a PDU session request for the service/slice is piggybacked together, but the network shall reject a SM request corresponding to the corresponding service/slice if the network has to reject service/slice to which PDU session creation is requested. However, if the corresponding service/slice has been rejected in an access step of the UE (i.e., step of checking S-NSSAI included in the requested NSSAI and determining whether the S-NSSAI is allowable/acceptable service/slice), the AMF cannot forward or may not forward the SM request for the service/slice to the SMF. Even in this case, the UE can receive a response to the MM/RM request, but cannot receive a response to the SM request piggybacked together.

4) Problem 2. Handling in forwarding failure due to MM/RM layer problem when forwarding SM message Due to the architecture of 5GS or 5GC, in order to forward a SM NAS message, the SM NAS message shall go through the AMF, and information, etc. on forwarding/routing shall be added to the part that the AMF can interpret/recognize. Thus, the SM NAS message requires additional message handling before it is forwarded to a lower layer (RRC) as in the conventional technology (EPS, UMTS). If a layer performing the message handling is a MM or RM layer, the following problems may arise.

In order to create a new session or manage/release an existing session in a SM NAS layer or a sublayer of the UE, the SM NAS message can be generated. A MM NAS layer of the UE describes/adds additional information (e.g., information such as PDU session ID, DNN and/or S-NSSAI, etc.) to the SM NAS message and encapsulates the SM NAS message. The encapsulated SM NAS message may be an extended form of a SM message or may be a MM/RM message such as MM NAS transport.

5) Problem 2-1. When problem occurs in radio or N2 section

If the forwarding of a MM/RM message fails or is rejected due to any problem in a lower section (e.g., a radio AS section including RRC or RRC lower layer or a N2 section between the RAN and the AMF) in a process for sending the MM/RM message to the AMF, the UE is instructed the forwarding failure from the lower layer before the rejection in the NAS layer. This problem is that because the forwarding failure indication at the lower layer is generally forwarded only up to the MM/RM layer or the layer finally encapsulating the NAS message, the SM layer generating the SM NAS message cannot recognize it.

6) Problem 2-2. In case of rejection at AMF

The MM/RM message or the encapsulated NAS message has been forwarded to the AMF, but the SM NAS message is not forwarded to the SMF and may be rejected due to the problem in terms of RM, access, or AMF. In this instance, the AMF sends a reject message to the MM/RM layer of the UE or a layer encapsulating the SM message. However, since the AMF cannot generate the SM reject message, the SM layer of the UE cannot receive a response to the SM NAS message although it has sent the SM NAS message.

Hereinafter, various methods for solving the above-described problems are proposed.

<Invention Proposal 1. Interaction Between MM-SM Layers at UE>

The invention proposal 1 is to solve the problems described above through an interaction between several layers or sublayers (e.g., MM, RM, SM, CM, RRC, etc.) within a UE.

Before describing this, in the present specification, a MM layer refers to a layer responsible for overall mobility management and access and may correspond to a RM layer in 5GS. That is, in the present specification, description/embodiments of the MM layer may be equally/similarly applied to the RM layer. The SM layer, the MM layer, etc., may be a sublayer of a NAS layer. In the present specification, a SM (sub)layer, a SM NAS (sub)layer, and a 5GSM (sub)layer may be used in the same sense, and a MM (sub)layer, a MM NAS (sub)layer, and a 5GMM (sub)layer may be used in the same sense. Further, messages (e.g., MM message) that are transmitted and received between the UE and the AMF may be commonly referred to 'UL/DL NAS message' for convenience of explanation.

Figure 19:
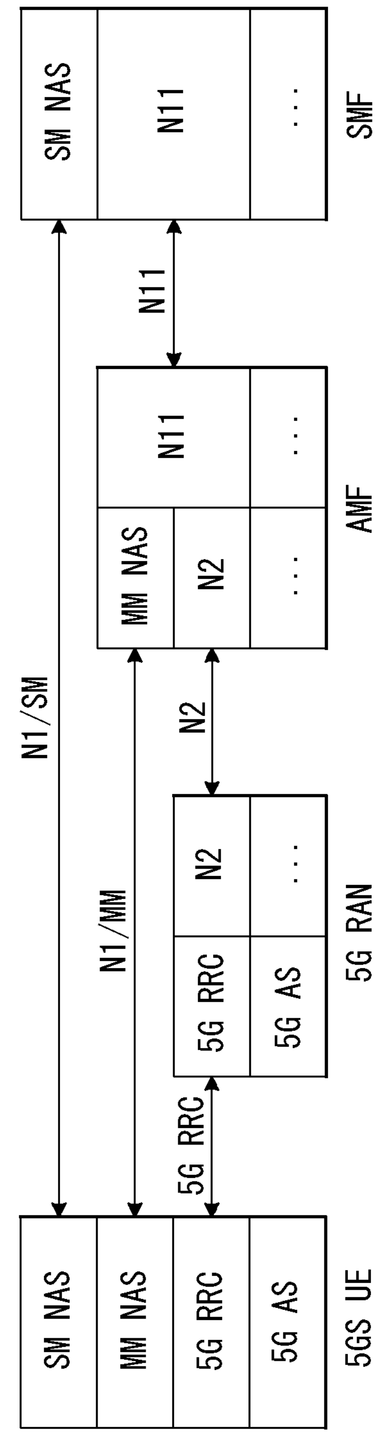
FIG. 19 illustrates a control plane protocol stack of a UE applicable to the present invention.

FIG. 19 illustrates a control plane protocol stack of a UE applicable to the present invention.

Referring to FIG. 19, a SM layer may be located as an upper layer of a MM layer, unlike a related art. Thus, a UE may forward a (5G) SM message generated by the SM layer (within the UE) to the MM layer that is the lower layer. In this instance, a NAS timer at the SM layer of the UE may start according to a SM procedure to which the corresponding message is sent. A timer of different characteristic and length are generally defined for each SM procedure. Even if multiple SM procedures are simultaneously performed and the same SM procedure is performed on multiple sessions, a separate timer may be assigned to each session. For example, if PDU session establishment procedures for PDU sessions #1 and #2 are simultaneously performed in parallel/independently, a timer (e.g., T35xx) may be assigned/segmented/initiated for each session or for another unit defined separately. The timer is defined/configured as a message response waiting time in the corresponding NAS procedure. If a timer expires due to no response within the waiting time, the UE can retransmit the corresponding message by a predetermined number of times. If even the retransmission of the message by the predetermined number of times fails, the UE may regard the corresponding procedure as a failure and perform a subsequent operation (e.g., stop a PDU session establishment/change procedure). The subsequent operation may be assumed to be applied similarly to NAS of EPS and EPC and has been described in TS 24.301 and TS 24.008.

A MM NAS layer may piggyback a SM message forwarded from the upper layer to a (5G) MM message including additional information and transmit it to the lower layer. That is, a (5G) SM message may be piggybacked to a specific (5G) MM transmission message. To this end, the (5G) SM message may be transmitted as an information element of the (5G) MM transmission message. In this case, the UE, the AMF, and the SMF may perform a (5G) MM procedure and a (5G) SM procedure in parallel/independently. Thus, the success of the (5G) MM procedure is irrelevant to the success of the piggybacked (5G) SM procedure.

The MM layer may also initiate/use a MM NAS timer for managing the MM procedure. The purpose of the corresponding timer is also the same as the above-described SM NAS timer, and a subsequent operation upon timer expiration may be defined for each procedure. The subsequent operation may be assumed to be applied similarly to NAS of EPS and EPC and has been described in TS 24.301 and TS 24.008.

The MM message forwarded to the lower layer may be sent to the AMF via 5G RAN through a radio layer. The MM layer of the AMF receiving the message may select an appropriate SMF based on SM NAS forwarding/routing information included in the MM message and may forward/route the corresponding MM NAS message or forward/route the corresponding MM NAS message to the already selected SMF. However, the AMF may reject the MM message itself due to problems with the AMF and/or problems at the MM NAS layer. And/or, if there is a problem (e.g., no routing, no serving SMF found, etc.) in the processing of the SM message due to causes related to the SM layer, the AMF may reject the MM message.

In this case, the AMF may forward, to the UE, a MM reject message in which a reject cause (i.e., MM (reject) cause value/code) is specified/included. More specifically, if the reject cause is a problem with the AMF and the MM layer, the AMF may send a cause code indicating/stating the cause to the UE. If the reject cause is a problem related to the SM message processing, the AMF may send a cause code indicating/stating the cause to the UE. For example, a cause value/code may be defined as follows.

XX. SM message handling failure

YY. No valid SMF available

The cause value/code may be used 1) if the processing in the AMF is impossible due to the problem of the SMF (e.g., #YY), and 2) if information in the AMF is not sufficient or the processing of the SM message is impossible due to the problem of the AMF in a situation where the SM message has to be processed (e.g., #XX). However, the present specification is not limited thereto, and the cause value/code can be defined/implemented in various embodiments in order to indicate/state the reject cause.

If the UE (particularly, the MM NAS layer of the UE) receives a (MM) reject message, the UE can stop a NAS timer that is running for a MM procedure corresponding to the first rejected MM message. Further, the UE (particularly, the MM NAS layer of the UE) can check the cause value/code included in the (MM) reject message received from the AMF and take action (e.g., stop the PDU session establishment/change procedure) according to the cause value/code. The UE (particularly, the MM NAS layer of the UE) can take action (e.g., stop the PDU session establishment/change procedure) according to a case of indicating that the cause is related to the AMF. In addition, the UE may forward, to the SM layer that is the upper layer, rejection information/indication that the MM procedure has failed/been rejected (i.e., rejection information/indication that the SM message cannot be routed/forwarded).

The rejection information/indication is defined in the form of an inter-layer indication, i.e., is not defined in a separate message type, and may be forwarded to the inter-layer in the form of information/indication itself. The rejection information/indication may include MM failure/rejection information and MM failure/reject cause if a failure/reject cause is a MM related cause, and may include SM failure/rejection information (e.g., SM message routing failure/rejection information and failure/reject cause) if the failure/reject cause is a SM related cause. In addition, the rejection information/indication may further include other information for failure/rejection related handling (e.g., back-off timer), and the like. Here, respective information/indication items that can be included in the rejection information/indication may be selectively included in rejection information/indication depending on its cause and the embodiment implementation.

And/or, if the MM layer of the UE determines that it needs to forward information to the SM layer, the MM layer of the UE may autonomously generate a pseudo-SM message and forward it to the upper layer. The pseudo-SM message may be sent in the form of a reject message for a (SM) request message had been requested by the SM layer, and may be forwarded to the upper layer, including a SM cause mapped to a cause that the MM layer receives (from the AMF). For example, if the received MM cause is (temporary) AMF failure/rejection (due to congestion) or the like, the UE (particularly, the MM NAS layer of the UE) may include, in the pseudo-SM message, a timer value similar to a MM back-off timer value received from the SM cause and/or the MM layer indicating a cause such as the congestion.

The SM layer of the UE may perform a subsequent operation according to a (pseudo-) SM reject message forwarded from the lower layer. Since the SM layer has received a response (in particular, a reject) to the request according to a fixed timer operation, the SM layer may stop a related SM NAS timer and perform a defined operation. However, it may be limited to a case where the MM layer and the SM layer of the UE use the same security context.

The SM layer receiving the rejection information/indication from the MM layer that is the lower layer may stop a SM NAS timer (e.g., T3580) for a rejected/failed (NAS) procedure and perform an operation according to this.

If a reject cause (i.e., MM cause) that the MM layer receives from the AMF is related to MM, the MM layer may inform the SM layer about whether a problem in the MM layer upon the forwarding of the rejection information/indication is temporary or permanent. If a reject cause that the MM layer receives from the AMF is related to SM (i.e., SM cause), the MM layer of the UE may inform the SM layer about a detailed SM reject cause upon the forwarding of the rejection information/indication. That is, the MM layer may inform that the rejection of the MM layer (i.e., no routing/forwarding of the SM message) is due to impossibility/failure/rejection (i.e., the detailed cause) of the SM related processing of the AMF.

If a failure/reject cause is permanent, the SM layer of the UE may perform a release procedure for a session or a DN, etc. requesting the corresponding SM message. And/or, the SM layer of the UE may manage the session or the DN by including the corresponding session or the DN in a forbidden list, not to perform an additional procedure on the corresponding session or the DN, etc. If a service for the corresponding session is absolutely necessary, the SM layer of the UE may request deregistration to the MM layer and trigger a procedure for searching new PLMN.

<Invention Proposal 1-1. SM or MM with Specific Service Rejection Accepted>

In case of using network slicing as in scenario presented in the problem 1-2, even if a MM procedure is accepted, detail service/slice requested through the corresponding MM procedure may be rejected. If a request of creating a PDU session is piggybacked, services requested by the corresponding PDU session may be included in a SM request in the form of S-NSSAI and may also be included in a requested NSSAI list included in a MM request message.

Based on the invention proposal 1, it may be assumed that the UE sends a registration or a MM request/message, that piggybacks a SM message, to a network, and the network accepts the registration or the MM request/message, but rejects a service that is individually requested from the corresponding request/message. In this instance, if the rejected service is a service of a SM request through the piggybacked SM message, the AMF may operate as follows.

The AMF can perform verification and authorization on a requested NSSAI included in the MM request/message and determine allowed NSSAI/accepted NSSAI for the UE. If a SM request/message and S-NSSAI corresponding to the SM request/message are specified in the MM request/message, the AMF first performs a NSSAI verification procedure before forwarding the SM message to the SMF, and shall check whether services of the corresponding S-NSSAI service are allowed to the UE. If the verification target S-NSSAI is not included in the allowed/accepted NSSAI, the AMF may discard the SM message corresponding to the verification target S-NSSAI and send a MM accept message for the MM request/message to the UE.

The MM accept message may include allowed/accepted (S-)NSSAI information, rejected (S-)NSSAI information, and/or a reject cause. Further, the MM accept message may include information about whether a rejection for (S-)NSSAI is temporary or permanent, and/or a more detailed reject cause. In addition, if the AMF rejects the (S-) NSSAI for a temporary cause such as congestion, the AMF may transmit a back-off timer value by including the back-off timer value in the MM accept message.

If the SM request/message receives the piggybacked MM request/message, the AMF may include information indicating, that the S-NSSAI requested via the corresponding SM request/message has been rejected, in SM related information (within the MM accept message for the MM request/message). This may be included in the form of a predefined bit/flag indication, an SM cause, or the following MM cause. In this instance, a MM cause value is a special case and may represent/mean a reject cause for the piggybacked SM request/message, not a rejection for the MM request/message. Configuration examples of the cause may be implemented in the following embodiments.

XX. Piggybacked SM message rejected.

YY. S-NSSAI for piggybacked SM message not allowed.

If the UE receives a MM accept response from the AMF, the UE may process it similar to the manner proposed in the invention proposal 1. The MM layer may inform the SM layer of a rejection based on information received from the AMF, and the rejection may be forwarded in the form of indication/information or a pseudo-SM message as proposed in the invention proposal 1. However, in the case, since the MM procedure has succeeded, information forwarded to the SM layer may be limited to information on SM failure/rejection. If the SM layer receives the information on SM failure/rejection from the lower layer, the SM layer stops a timer (e.g., T3580) and performs a predefined additional/subsequent operation according to received information.

<Invention Proposal 1-2. Interaction Between SM Layer, MM Layer, and AS Layer>

There may occur a case where a MM request message does not reach an AMF in a process for sending a MM message due to problems of AS layer/segment and/or N2 layer/segment. This may be due to a radio link forwarding/routing failure, a forwarding/routing failure due to a specific reason of the AS layer/segment, and/or a forwarding/routing failure due to a specific reason of the N2 layer/segment, and the like. If the AS layer/segment has recognized such a failure, the AS layer/segment may notify the upper layer of it.

A MM layer may perform an operation according to a failure related indication (lower layer indication)/information received from the lower layer (e.g., the AS layer/segment). If a SM message has been piggybacked and transmitted to the MM message, the MM layer may forward forwarding/routing failure indication/information to the SM layer. The failure indication/information is forwarded using the method proposed in the invention proposal 1, but a failure cause to be forwarded may be differentiated from that in the invention proposal 1. For example, the failure cause may be forwarded to the SM layer as indication/information representing a lower layer (forwarding/routing) failure, etc. (#XX), or may be forwarded to the SM layer via a pseudo-SM message as a cause value/code representing a lower layer (forwarding/routing) failure, etc.

<Invention Proposal 1-3. Interaction Between SM Layer and NAS Sublayer>

Figure 20:
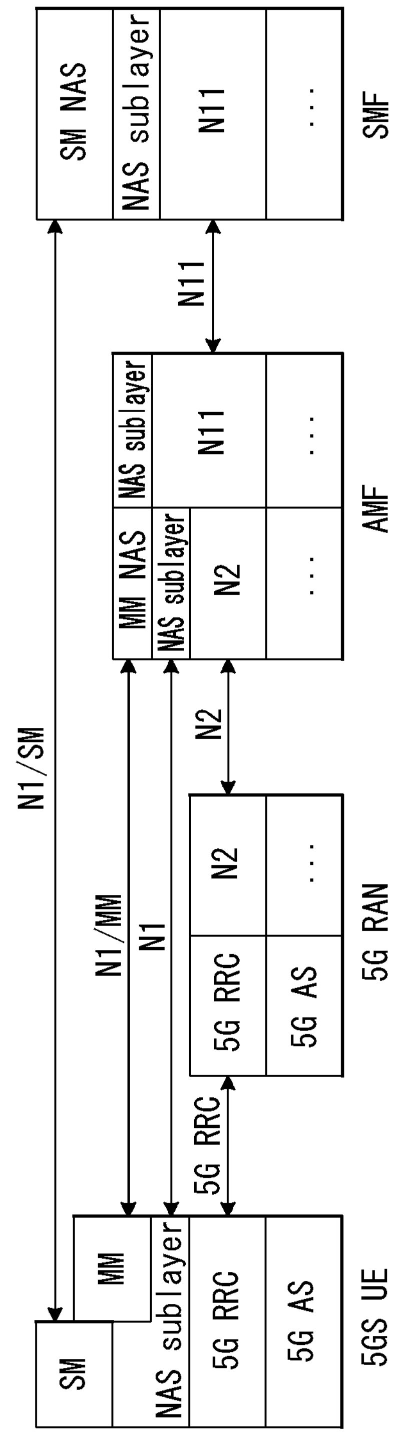
FIG. 20 illustrates a control plane protocol stack within a UE according to an embodiment of the present invention.

FIG. 20 illustrates a control plane protocol stack within a UE according to an embodiment of the present invention.

An NAS sublayer newly defined/proposed in FIG. 20 is a sublayer capable of supporting both MM and SM and may be responsible for reliable NAS message forwarding between core-UE.

Upon protocol stack application of the invention proposal 1-3, an interaction between a MM layer and a SM layer among the operations proposed in the invention proposals 1, 1-1, and 1-2 may be applied to the NAS sublayer. That is, the interaction between the MM layer and the SM layer proposed above may be controlled/performed by the NAS sublayer, and the invention proposal 1-3 is different from the invention proposals 1, 1-1, and 1-2 in that information delivery to the SM layer, which has been performed by the MM layer, is performed by the NAS sublayer (i.e., information delivery from the MM layer to the SM layer via the NAS sublayer). Thus, information delivered to the SM layer by the NAS sublayer and an information delivery manner are similar to the embodiments proposed above.

<Invention Proposal 2. AMF Handling/Control of SM Procedure>

The invention proposal 2 is to solve problems described above through a SM procedure handling/control of an AMF.

Before describing this, in the present specification, a MM layer refers to a layer responsible for overall mobility management and access and may correspond to a RM layer in 5GS. That is, in the present specification, description/embodiments of the MM layer may be equally/similarly applied to the RM layer. The SM layer, the MM layer, etc., may be a sublayer of a NAS layer. In the present specification, a SM (sub)layer, a SM NAS (sub)layer, and a 5GSM (sub)layer may be used in the same sense, and a MM (sub)layer, a MM NAS (sub)layer, and a 5GMM (sub)layer may be used in the same sense. Further, messages (e.g., MM message) that are transmitted and received between the UE and the AMF may be commonly referred to 'UL/DL NAS message' for convenience of explanation.

The AMF cannot currently recognize a SM message (which is transparent to AMF) and can determine only forwarding/routing of the SM message based on SM related information added to the outside of the SM message. Therefore, the AMF has a limitation in performing an operation related to the SM, which causes the above-described problems.

In order to solve the problems, a SMF (hereinafter referred to as 'SMF for error') of special purpose for handling/processing an error, such as a case where the AMF cannot route/forward a SM request/message to the SMF or a case where a requested service itself is not allowed, can be newly defined separately. The 'SMF for error' may not have a function for a normal session management/procedure and may be defined as an SMF that performs only an operation for coping with a SM (request/message) rejection case (or the above-described error case, etc.). And/or, the operation/function of the 'SMF for error' may be implemented/performed in a 'default SMF'.

As pointed out above, if there occurs a failure/rejection case, such as a case where MM/SM fails/is rejected at the AMF or a case where services are rejected at the AMF, the AMF may send a received SM message to the 'SMF for error'. Such an operation may be previously defined by network operator's policy and/or configuration. The AMF may additionally deliver, to the 'SMF for error', information about a problem situation (i.e., routing/forwarding failure situation of the SM message) and/or a failure/reject cause through an N11 message, when sending the SM message to the 'SMF for error'.

The 'SMF for error' may generate a SM reject message based on information received from the AMF and/or information included in the SM message and send it to the AMF. The AMF may send by piggybacking the SM reject message to a MM reject/accept message upon MM reject/accept. In this case, the MM layer and the SM layer of the UE each may perform an additional operation/procedure according to a network response (i.e., the MM reject/accept message). In this instance, the additional operation/procedure is as described in TS 23.502, and a detailed operation of the NAS layer is assumed to be similar to NAS of EPS and EPC and is described in TS 24.301 and TS 24.008.

<Invention Proposal 2-1. SM Sublayer within AMF>

Figure 21:
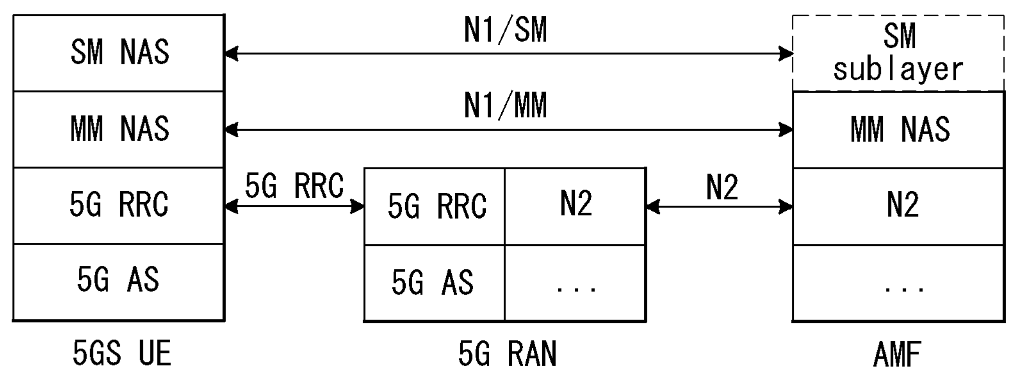
FIG. 21 illustrates a control plane protocol stack within a UE according to an embodiment of the present invention.

FIG. 21 illustrates a control plane protocol stack within a UE according to an embodiment of the present invention.

Referring to FIG. 21, a function of the 'SMF for error' proposed in the invention proposal 2 may be implemented as a sublayer of the AMF not a separately defined SMF. In this case, the AMF can perform error processing/handling using a SM sublayer implemented inside the AMF without an interaction with the separate SMF. The function/operation of the SM sublayer may be the same as 'SMF for error' described in the invention proposal 2.

It is possible to locally release (implicitly) a PDU session at the CN side for a specific cause, and the AMF can remove a context of the locally released PDU session. In this instance, if the UE is in a CM-IDLE state, the UE can maintain the context for the corresponding PDU session as a result of not receiving an explicit release message for the corresponding PDU session. Afterwards, the UE can perform the following MM procedure including/using a corresponding PDU session ID, in order to receive services with the corresponding PDU session (e.g., if MO data is generated).

Registration update (PDU session activation)

Service request (PDU session activation)

However, the corresponding PDU session is already in a locally released state at the CN, and there is no serving SMF information for the corresponding PDU session at the AMF. That is, there arises a problem that the UE unnecessarily performs/initiates a MM procedure for the already released PDU session. As one method for solving the problem, a method may be proposed to allow the UE to know whether to locally release the PDU session through the PDU session status exchange between the UE and the AMF. However, even in this instance, since the UE cannot still know a local release cause of the PDU session, there may arise a problem that the UE performs/initiates again the MM procedure for the released PDU session. For example, the PDU session may be locally released for a cause such as a release due to a specific SMF problem, change in user's subscription information (within UDM), and/or change in subscription information at the AMF. However, since the UE does not know a release cause, the UE may request again the establishment of the PDU session. Further, if the PDU session is released due to a cause such as a local area data network (LADN) and mobility limitation (e.g., LADN region deviation, non-allowed region entry, etc.), the AMF can know the release of the PDU session and adjust PDU session status synchronization. However, there is a problem that the UE cannot be informed of it (SM/MM separation).

Accordingly, a method for solving the problem is proposed below with reference to FIG. 22.

Figure 22:
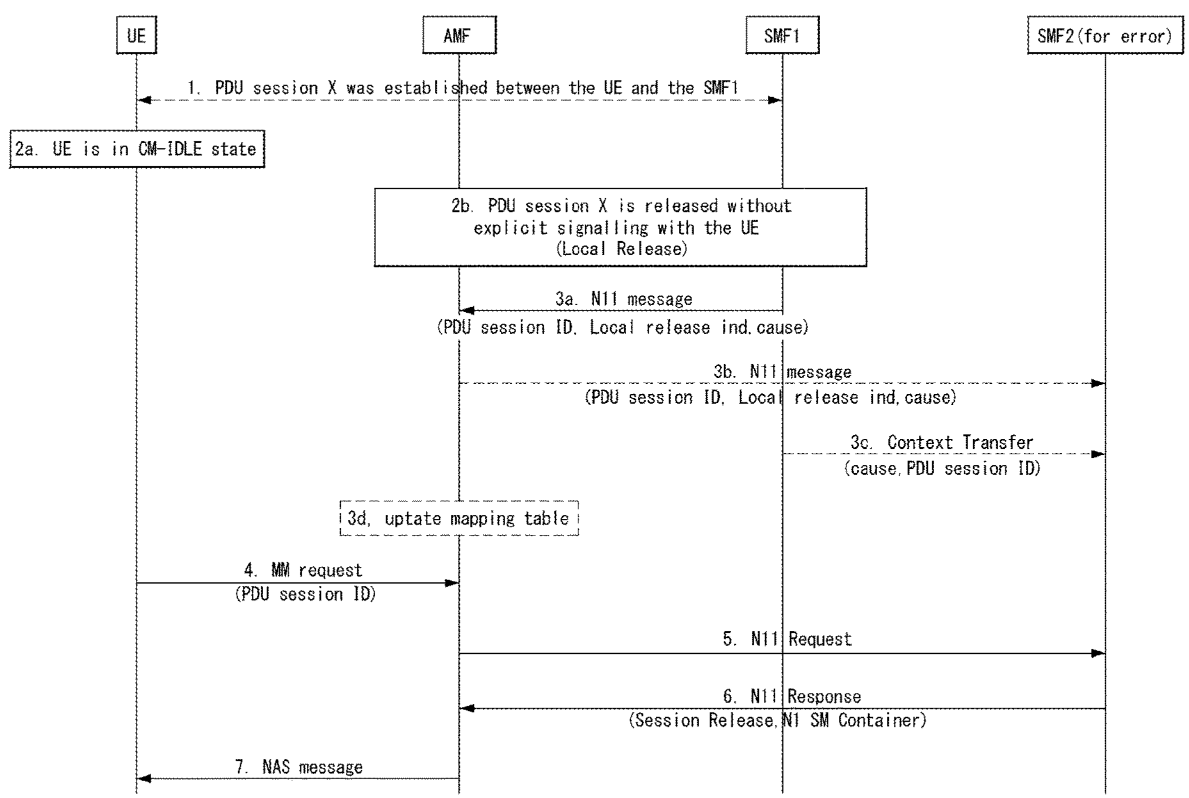
FIG. 22 is a flow chart illustrating an application example of invention proposal 2 if PDU session synchronization fails.

FIG. 22 is a flow chart illustrating an application example of the invention proposal 2 if PDU session synchronization fails.

1. First, PDU session X may be established between a UE and SMF1.

2a. Next, the UE may enter a CM-IDLE state.

2b. Next, the PDU session X may be released without explicit/implicit signaling with the UE (local release).

3a. In case of a PDU session local release requiring an additional operation not a normal PDU session local release, the SMF1 may forward a release cause to an AMF via a N11 message. In particular, the N11 message may include a locally released PDU session ID, a local release indication (ind), and/or a release cause.

3b. If the AMF is connected to 'SMF2 (SMF for error)' proposed in the invention proposal 2 (or if a SMF sublayer proposed in the invention proposal 2-1 is implemented), the AMF may transmit information received from the SMF1 in the 3a to the SMF2 (or the SMF sublayer). That is, the information received from the SMF1 may be transmitted to the SMF2 in the form of N11-N11 message delivery through the AMF. In this case, the SMF1 may specify/indicate a target SMF (i.e., SMF2) address or ID to the AMF.

3c. If an interface exists between the SMFs, the release cause and locally released PDU session ID information may be transmitted from SMF1 to the SMF2 in the form of context delivery.

That is, one of the steps 3b and 3c may be selectively performed according to an embodiment.

3d. If the AMF receives the N11 message through the step 3a, the AMF may update a serving SMF mapping for a PDU session that has been currently stored. In this case, the AMF may specify and store/update SMF2 (i.e., 'SMF for error') as a serving AMF corresponding to the indicated PDU session ID through the received N11 message, or specify and store/update that the PDU session corresponding to the indicated PDU session ID has been locally released.

4. If the UE has requested activation for the already locally released PDU session, the AMF may perform the following operation, if necessary or desired.

If it is reported that the SMF2 mapped to the PDU session requested by the UE is SMF2 (i.e., SMF for error) or is locally released:

5. The AMF may forward a PDU session activation request to the SMF2 via a N11 request message.

6-7. The SMF2 may forward, to the UE, an activation reject for the already locally released PDU session through the AMF using a N11 response message. In this instance, the SMF2 may also forward, to the UE, the release cause received through the step 3b or 3c. If it is necessary to limit the retry of the UE, the SMF2 may also forward, to the UE, a retry back-off timer value for the locally released PDU session.

If the PDU session requested by the UE is locally released without any action:

The AMF may update a PDU session status field and send a service accept or reject message to the UE.

<Invention Proposal 3. Applicability for Non-3GPP Access

5G RAN, 5G AS, 5G RRC, etc. specified in the invention proposals 1 and 2 have been specified to be described based on 3GPP access, i.e., NR, 5G LTE, and 5G-RAN, but are not limited thereto. They may be equally/similarly applied to non-3GPP access. In this case, the role of 5G RAN may be replaced by N3IWF, and RRC may correspond to the lower layer of NAS.

Figure 23:
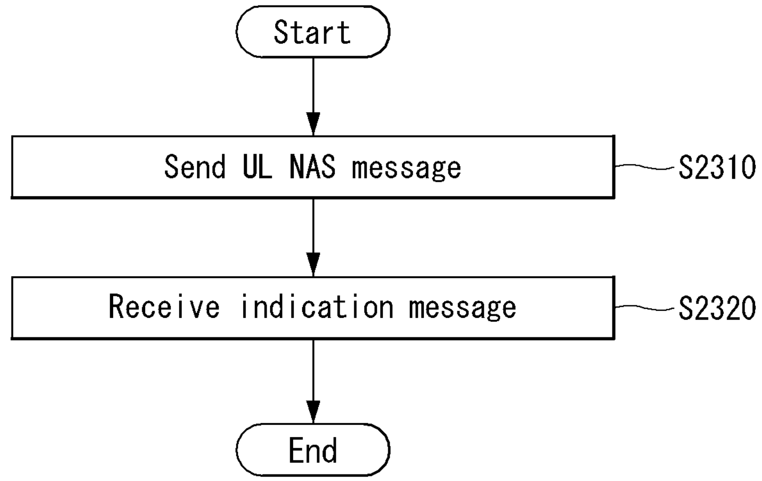
FIG. 23 is a flow chart illustrating a method for sending a NAS message of a UE according to an embodiment of the present invention.

FIG. 23 is a flow chart illustrating a method for sending a NAS message of a UE according to an embodiment of the present invention. The embodiment/description proposed in the invention proposal 1 may be equally applied to the flow chart, and duplicate description is omitted.

First, a UE may send an UL NAS message including a SM message to an AMF in S2310. In this instance, the SM message may be a message for performing a request (e.g., PDU session establishment/change, etc.) related to a PDU session. The SM message may be generated in a SM sublayer within the UE and forwarded to a MM sublayer that is a lower layer of the SM sublayer, and the UL NAS message including the SM message may be sent to the AMF by the MM sublayer. Here, the SM sublayer may correspond to a sublayer for PDU session control that is defined in the UE, and the MM sublayer may correspond to a sublayer for mobility control of the UE that is defined in the UE. The UL NAS message may further include DNN and/or S-NSSAI used for the selection of a SMF to forward the SM message. Further, if the SM message is a message requesting an establishment of the PDU session, the UL NAS message may further include a PDU session ID for the PDU session to which the establishment is requested.

Next, the UE may receive, from the AMF, an indication message indicating that the SM message is unroutable, in S2320. The indication message may additionally include an unroutable cause value of the SM message. Indication information indicating that the SM message is unroutable may be generated by the MM sublayer receiving the indication message and transmitted to the SM sublayer of the UE. In this instance, the MM sublayer may deliver, to the SM sublayer, information about whether the unroutable SM message is permanent or temporary, together with the indication information. If the unroutable SM message is permanent, the SM sublayer may perform a release procedure for a PDU session and/or DN related to the SM message. Furthermore, the SM sublayer may include the corresponding PDU session and/or DN in a procedure forbidden list and manage them, not to perform an additional procedure for the corresponding PDU session and/or DN (particularly, identification information for the corresponding PDU session and/or DN). If services related to the corresponding PDU session and/or DN are required, the SM sublayer may request deregistration to the MM sublayer and trigger a procedure for searching new PLMN.

If the SM sublayer forwards the SM message to the MM sublayer, a pre-configured timer may start. If the SM sublayer receives the indication information from the MM sublayer before the timer expires, the SM sublayer may stop the timer and stop a procedure (e.g., PDU session establishment/change procedure, etc.) related to the SM message. If the timer expires, the SM sublayer may retransmit the SM message to the MM sublayer by a predetermined number of times. If the retransmission by the predetermined number of times fails, the SM sublayer may stop the procedure (e.g., PDU session establishment/change procedure, etc.) related to the SM message.

Figure 24:
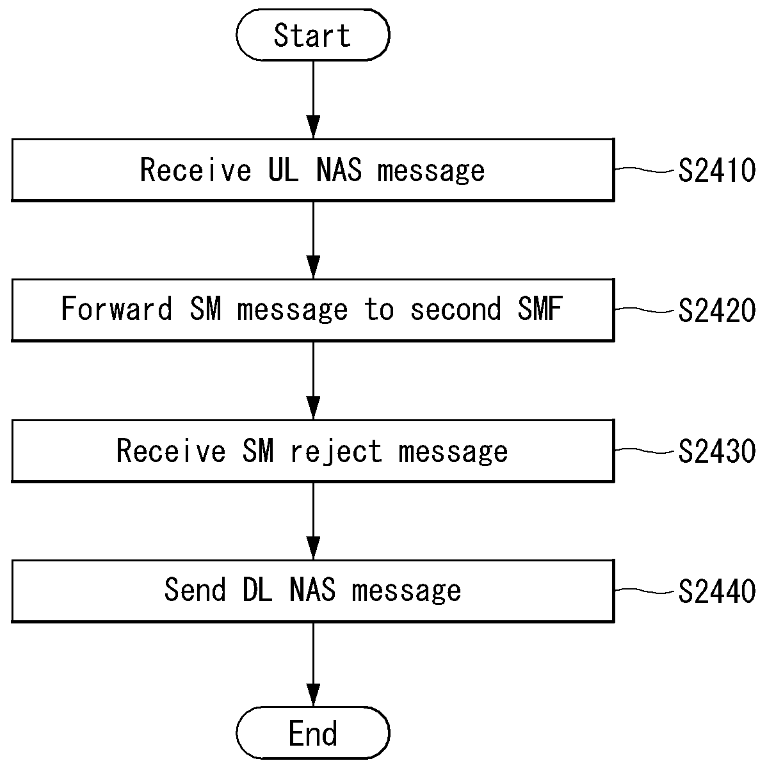
FIG. 24 is a flow chart illustrating a method for sending a NAS message of an AMF according to an embodiment of the present invention.

FIG. 24 is a flow chart illustrating a method for sending a NAS message of an AMF according to an embodiment of the present invention. The embodiment/description proposed in the invention proposal 2 may be equally applied to the flow chart, and duplicate description is omitted.

First, an AMF may receive, from a UE, an UL NAS message including a SM message for a PDU session related request (e.g., PDU session establishment/change, etc.) in S2410. The UL NAS message may correspond to a MM message in which the SM message is included/piggybacked.

Next, if the AMF decides that the SM message is unroutable to a first SMF that is a forwarding target of the SM message, the AMF may forward the SM message to a pre-configured second SMF in S2420. In this instance, the AMF may decide that the SM message is unroutable based on various causes. For example, if a PDU session related request target via the SM message is an already locally released PDU session, the AMF may decide that the SM message is unroutable to the first SMF. The SM message may be forwarded to the second SMF via a first N11 message. Further, an unroutable cause of the SM message together with the SM message may be forwarded to the second SMF via the first N11 message.

Next, the AMF may receive a SM reject message for the SM message from the second SMF in S2430. Here, the second SMF may be a SMF defined independently from the first SMF, in order to process the unroutable SM message. The second SMF may be implemented as a NAS sublayer within the AMF not a default SMF or a separate SMF according to an embodiment.

Next, the AMF may send a DL NAS message including the SM reject message to the UE.

Although not shown in the flow chart, the AMF may receive a retry back-off timer value of the PDU session related request from the second SMF.

If a PDU session is locally released, the AMF may receive a second N11 message from the first SMF. In this instance, the second N11 message may include an ID, a local release indication, and/or a local release cause of the PDU session. In this case, the AMF may update status (e.g., a release status) information of the locally released PDU session based on the received second N11 message. The ID, the local release indication, and/or the local release cause of the PDU session may be delivered from the AMF to the second SMF or from the first SMF to the second SMF.

Since the inventions proposed above enables interaction/information exchange between NAS layers/entities in preparation for various message forwarding/routing failure situations that may occur when the SM layer procedure and the MM layer procedure in 5GS and 5GC are independently separated and are simultaneously performed, they can improve the message forwarding reliability/efficiency of the UE and the network and solve various problems resulting from the message forwarding/routing failure.

Overview of device to which the present invention is applicable

Figure 25:
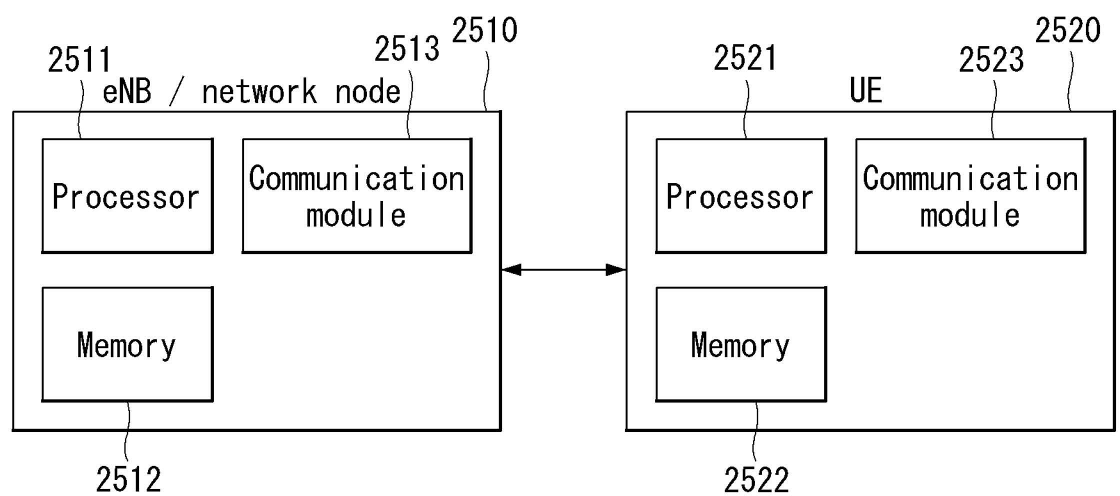
FIG. 25 illustrates a block configuration diagram of a communication device according to an embodiment of the present invention.

FIG. 25 illustrates a block configuration diagram of a communication device according to an embodiment of the present invention.

Referring to FIG. 25, a wireless communication system includes a network node 2510 and a plurality of UEs 2520.

The network node 2510 includes a processor 2511, a memory 2512, and a communication module 2513. The processor 2511 implements functions, processes, and/or methods proposed above. Layers of wired/wireless interface protocol may be implemented by the processor 2511. The memory 2512 is connected to the processor 2511 and stores various types of information for driving the processor 2511. The communication module 2513 is connected to the processor 2511 and transmits and/or receives wired/wireless signals. An example of the network node 2510 may correspond to a base station, MME, HSS, SGW, PGW, an application server, or the like. In particular, if the network node 2510 is the base station, the communication module 2513 may include a radio frequency (RF) unit for transmitting/receiving a radio signal.

The UE 2520 includes a processor 2521, a memory 2522, and a communication module (or RF unit) 2523. The processor 2521 implements functions, processes, and/or methods proposed above. Layers of a radio interface protocol may be implemented by the processor 2521. The memory 2522 is connected to the processor 2521 and stores various types of information for driving the processor 2521. The communication module 2523 is connected to the processor 2521 and transmits and/or receives a radio signal.

The memories 2512 and 2522 may be inside or outside the processors 2511 and 2521 and may be connected to the processors 2511 and 2521 through various well-known means. Further, the network node 2510 (in case of the base station) and/or the UE 2520 may have a single antenna or multiple antennas.

Figure 26:
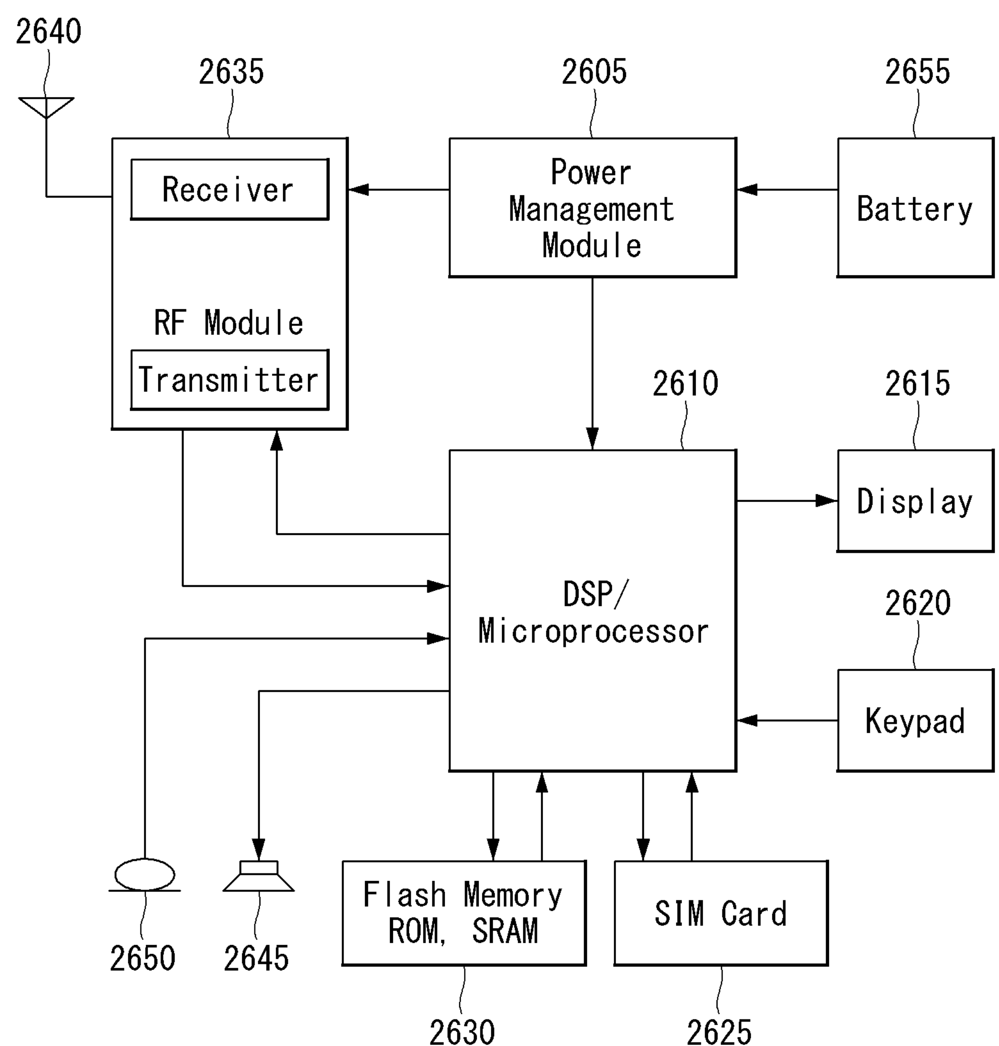
FIG. 26 illustrates a block configuration diagram of a communication device according to an embodiment of the present invention.

FIG. 26 illustrates a block configuration diagram of a communication device according to an embodiment of the present invention.

In particular, FIG. 26 illustrates in more detail the UE illustrated in FIG. 25.

Referring to FIG. 26, the UE may include a processor (or digital signal processor (DSP)) 2610, an RF module (or RF unit) 2635, a power management module 2605, an antenna 2640, a battery 2655, a display 2615, a keypad 2620, a memory 2630, a subscriber identification module (SIM) card 2625 (which is optional), a speaker 2645, and a microphone 2650. The UE may also include a single antenna or multiple antennas.

The processor 2610 implements functions, processes, and/or methods proposed above. Layers of a radio interface protocol may be implemented by the processor 2610.

The memory 2630 is connected to the processor 2610 and stores information related to operations of the processor 2610. The memory 2630 may be inside or outside the processor 2610 and may be connected to the processors 2610 through various well-known means.

A user inputs instructional information, such as a telephone number, for example, by pushing (or touching) buttons of the keypad 2620 or by voice activation using the microphone 2650. The processor 2610 receives and processes the instructional information to perform an appropriate function, such as to dial the telephone number. Operational data may be extracted from the SIM card 2625 or the memory 2630. Further, the processor 2610 may display instructional information or operational information on the display 2615 for the user's reference and convenience.

The RF module 2635 is connected to the processor 2610 and transmits and/or receives an RF signal. The processor 2610 forwards instructional information to the RF module 2635 in order to initiate communication, for example, transmit a radio signal configuring voice communication data. The RF module 2635 includes a receiver and a transmitter to receive and transmit the radio signal. The antenna 2640 functions to transmit and receive the radio signal. Upon reception of the radio signal, the RF module 2635 may transfer a signal to be processed by the processor 2610 and convert the signal into a baseband. The processed signal may be converted into audible or readable information output via the speaker 2645.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

Although the present invention has been described focusing on examples applying to the 3GPP LTE/LTE-A/NR (5G) system, it can be applied to various wireless communication systems other than the 3GPP LTE/LTE-A/NR (5G) system.

The invention claimed is:

1. A method performed by an access and mobility function (AMF) operating in a wireless communication system, the method comprising:

receiving, from a user equipment (UE), an uplink (UL) non-access stratum (NAS) message that comprises a session management (SM) message; and transmitting, to the UE, a downlink (DL) NAS message that comprises a cause value indicating that the SM message was not forwarded due to routing failure, wherein an indication that the SM message was not forwarded due to routing failure is transferred, from a lower sublayer of the UE to an upper sublayer of the UE, based on the cause value, wherein the SM message is generated in the upper sublayer of the UE and is provided to the lower sublayer of the UE, and wherein the UL NAS message comprising the SM message is sent to the AMF by the lower sublayer of the UE.

2. The method of claim 1, wherein the upper sublayer of the UE is a Session Management (SM) sublayer that performs protocol data unit (PDU) session control, and wherein the lower sublayer of the UE is a Mobility Management (MM) sublayer that performs mobility control of the UE.

3. The method of claim 1, wherein a pre-configured timer is started by the UE, based on the upper sublayer of the UE providing the SM message to the lower sublayer of the UE; and wherein the pre-configured timer is stopped by the UE, and a procedure related to the SM message is stopped, based on the upper sublayer receiving, from the lower sublayer, the indication that the SM message was not forwarded due to routing failure.

4. The method of claim 3, wherein at least one re-transmission of the SM message is performed by the UE, based on the pre-configured timer expiring, and a procedure related to the SM message is stopped by the UE, based on failure of the at least one re-transmission of the SM message.

5. The method of claim 1, wherein the UL NAS message further comprises a data network name (DNN) or single network slice selection assistance information (S-NSSAI) for the selection of a session management function (SMF) to forward the SM message.

6. The method of claim 2, wherein based on the SM message being a message requesting an establishment of a PDU session, the UL NAS message further comprises a PDU session identifier (ID) for the PDU session to which the establishment is requested.

7. The method of claim 1, wherein the lower sublayer forwards, to the upper sublayer, information about whether the SM message not being forwarded due to routing failure is permanent or temporary, together with the indication.

8. The method of claim 7, wherein based on the SM message not being forwarded due to routing failure being permanent, the upper sublayer performs a release procedure for a PDU session or a data network (DN) related to the SM message.

9. The method of claim 8, wherein the upper sublayer includes the PDU session or the DN in a procedure forbidden list and manages the PDU session or the DN.

10. The method of claim 8, wherein based on services related to the PDU session or the DN being required, the upper sublayer requests a deregistration to the lower sublayer.

11. An access and mobility function (AMF) configured to operate in a wireless communication system, the AMF comprising:

a transceiver;

at least one processor; and at least one computer memory operably connectable to the at least one processor and storing instructions that, when executed by the at least one processor, perform operations comprising:

receiving, via the transceiver from a user equipment (UE), an uplink (UL) non-access stratum (NAS) message that comprises a session management (SM) message; and transmitting, via the transceiver to the UE, a downlink (DL) NAS message that comprises a cause value indicating that the SM message was not forwarded due to routing failure; and wherein an indication that the SM message was not forwarded due to routing failure is transferred, from a lower sublayer of the UE to an upper sublayer of the UE, based on the cause value, wherein the SM message is generated in the upper sublayer of the UE and is provided to the lower sublayer of the UE, and wherein the UL NAS message comprising the SM message is sent to the AMF by the lower sublayer of the UE.

12. The AMF of claim 11, wherein the upper sublayer of the UE is a Session Management (SM) sublayer that performs protocol data unit (PDU) session control, and wherein the lower sublayer of the UE is a Mobility Management (MM) sublayer that performs mobility control of the UE.

13. The AMF of claim 11, wherein a pre-configured timer is started by the UE, based on the upper sublayer of the UE providing the SM message to the lower sublayer of the UE; and wherein the pre-configured timer is stopped by the UE, and a procedure related to the SM message is stopped, based on the upper sublayer receiving, from the lower sublayer, the indication that the SM message was not forwarded due to routing failure.

14. The AMF of claim 13, wherein at least one retransmission of the SM message is performed by the UE, based on the pre-configured timer expiring, and a procedure related to the SM message is stopped by the UE, based on failure of the at least one re-transmission of the SM message.

15. The AMF of claim 11, wherein the UL NAS message further comprises a data network name (DNN) or single network slice selection assistance information (S-NSSAI) for the selection of a session management function (SMF) to forward the SM message.

16. The AMF of claim 12, wherein based on the SM message being a message requesting an establishment of a PDU session, the UL NAS message further comprises a PDU session identifier (ID) for the PDU session to which the establishment is requested.

17. The AMF of claim 11, wherein the lower sublayer forwards, to the upper sublayer, information about whether the SM message not being forwarded due to routing failure is permanent or temporary, together with the indication.

18. The AMF of claim 17, wherein based on the SM message not being forwarded due to routing failure being permanent, the upper sublayer performs a release procedure for a PDU session or a data network (DN) related to the SM message.

19. The AMF of claim 18, wherein the upper sublayer includes the PDU session or the DN in a procedure forbidden list and manages the PDU session or the DN.

20. The AMF of claim 18, wherein based on services related to the PDU session or the DN being required, the upper sublayer requests a deregistration to the lower sublayer.

* * * * *